(12) United States Patent
Kim et al.

(10) Patent No.: US 12,194,967 B2
(45) Date of Patent: Jan. 14, 2025

(54) MASTER CYLINDER

(71) Applicant: HL MANDO CORPORATION, Gyeonggi-do (KR)

(72) Inventors: Yeonseong Kim, Gyeonggi-do (KR); Byungki Kim, Gyeonggi-do (KR); Minuk Sung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/109,586

(22) Filed: Feb. 14, 2023

(65) Prior Publication Data

US 2023/0256949 A1    Aug. 17, 2023

(30) Foreign Application Priority Data

Feb. 14, 2022  (KR) .................. 10-2022-0018903
Feb. 14, 2022  (KR) .................. 10-2022-0018904

(Continued)

(51) Int. Cl.
  *B60T 11/16*  (2006.01)
  *B60T 11/20*  (2006.01)
  *B60T 13/14*  (2006.01)

(52) U.S. Cl.
  CPC ............ *B60T 11/20* (2013.01); *B60T 11/16* (2013.01); *B60T 13/142* (2013.01)

(58) Field of Classification Search
  CPC ........ F15J 15/3224; F15J 15/32; B60T 11/16; B60T 13/142
  See application file for complete search history.

(56) References Cited

U.S. PATENT DOCUMENTS 4,448,429 A * 5/1984 Thomas .................. F16J 15/32
                                                    277/589
9,694,798 B2  7/2017 Bacardit et al.
10,640,098 B2  5/2020 Foerch et al.

FOREIGN PATENT DOCUMENTS

JP    2003-170824    6/2003
JP      6988417      1/2022
(Continued)

OTHER PUBLICATIONS

Office Action dated Aug. 22, 2024 for Korean Patent Application No. 10-2023-0019022 and its English translation provided by Applicant's foreign counsel.

*Primary Examiner* — Kenneth Bomberg
*Assistant Examiner* — Daniel S Collins
(74) *Attorney, Agent, or Firm* — WOMBLE BOND DICKINSON (US) LLP

(57) ABSTRACT

Disclosed is a master cylinder. The master cylinder includes a hydraulic block provided with a main bore formed therein in an axial direction, a first piston having one side inserted into the main bore to be displaceable and the other side exposed to an outside of the hydraulic block and connected to a brake pedal, a second piston inserted into the main bore more inside than the first piston to be displaceable, an elastic member provided between the first piston and the second piston and configured to provide a pedal feel, and a mounting block provided with a sub bore formed therein in the axial direction and the sub bore where the first piston is inserted thereinto and passes therethrough to be displaceable and having one side coupled to the other side of the hydraulic block, wherein the hydraulic block includes at least one hydraulic flow path formed through the other side, and the mounting block includes a connection flow path allowing the sub bore to communicate with the hydraulic flow path.

20 Claims, 27 Drawing Sheets

(30)  Foreign Application Priority Data

Feb. 14, 2022 (KR) ........................ 10-2022-0018905
Feb. 14, 2022 (KR) ........................ 10-2022-0018906
Jun. 10, 2022 (KR) ........................ 10-2022-0070492
Jun. 10, 2022 (KR) ........................ 10-2022-0070493

(56)  References Cited

FOREIGN PATENT DOCUMENTS

| | | | |
|---|---|---|---|
| KR | 10-2003-0070269 | 8/2003 | |
| KR | 10-2014-0059666 | 5/2014 | |
| KR | 10-2018-0038748 | 4/2018 | |
| KR | 10-2018-0039857 | 4/2018 | |
| KR | 10-2019-0023773 | 3/2019 | |
| KR | 10-2019-0037564 | 4/2019 | |
| KR | 10-2019-0039320 | 4/2019 | |
| WO | WO-2019111992 A1 * | 6/2019 | ............ B60T 13/142 |

* cited by examiner

MASTER CYLINDER

CROSS-REFERENCE TO RELATED APPLICATION

This application claims the benefit of Korean Patent Application Nos. 10-2022-0018905, 10-2022-0018906, 10-2022-0018904, 10-2022-0018903, filed on Feb. 14, 2022 and 10-2022-0070492 and 10-2022-0070493, filed on Jun. 10, 2022 in the Korean Intellectual Property Office, the disclosure of which are incorporated herein by reference.

BACKGROUND

1. Field

The present disclosure relates to a master cylinder, and more particularly, to a master cylinder in which operational reliability is ensured, and at the same time, operating noise and vibration are reduced.

2. Description of the Related Art

Brake systems for braking are essentially installed in vehicles, and in recent years, various types of systems for obtaining stronger and more stable braking forces have been proposed.

When a driver steps on a brake pedal, a brake system according to the related art supplies the liquid pressure required for braking to a wheel cylinder using a mechanically connected booster. However, in recent years, an electronic brake system that receives a braking intention of the driver as an electrical signal from a pedal displacement sensor that detects displacement of the brake pedal and supplies the liquid pressure required for braking to the wheel cylinder when the driver steps on the brake pedal has been widely used.

The electronic brake system includes a master cylinder connected to the brake pedal to generate the liquid pressure according to a stepping force of the brake pedal, a pedal stroke sensor that detects the displacement of the brake pedal, a liquid pressure supply device that generates a liquid pressure of a pressing medium by operating a motor on the basis of information detected by the pedal stroke sensor, and a liquid pressure control unit that regulates and supplies the liquid pressure generated by the liquid pressure supply device to the wheel cylinder.

SUMMARY

Therefore, it is an aspect of the present disclosure to provide a master cylinder having improved operational reliability and improved performance.

It is another aspect of the present disclosure to provide a master cylinder which can reduce noise and vibration generated when a piston is displaced.

It is still another aspect of the present disclosure to provide a master cylinder which can maintain a constant working stroke of the piston.

It is yet another aspect of the present disclosure to provide a master cylinder which can prevent a leakage of a pressing medium and inflow of foreign substances.

It is yet another aspect of the present disclosure to provide a master cylinder which can improve durability of a product by alleviating an impact applied to components.

It is yet another aspect of the present disclosure to provide a master cylinder which can promote assembly and miniaturization of the product.

Additional aspects of the disclosure will be set forth in part in the description which follows and, in part, will be obvious from the description, or may be learned by practice of the disclosure.

In accordance with one aspect of the present disclosure, a master cylinder includes a hydraulic block provided with a main bore formed therein in an axial direction, a first piston having one side inserted into the main bore to be displaceable and the other side exposed to an outside of the hydraulic block and connected to a brake pedal, a second piston inserted into the main bore more inside than the first piston to be displaceable, an elastic member provided between the first piston and the second piston and configured to provide a pedal feel, and a mounting block provided with a sub bore formed therein in the axial direction and the sub bore where the first piston is inserted thereinto and passes therethrough to be displaceable and having one side coupled to the other side of the hydraulic block, wherein the hydraulic block includes at least one hydraulic flow path formed through the other side, and the mounting block includes a connection flow path allowing the sub bore to communicate with the hydraulic flow path.

The hydraulic flow path may be spaced a certain distance from the main bore on the hydraulic block, and the connection flow path may have one end exposed to the one side of the mounting block and the other end connected to the sub bore and may be penetrated to be inclined at a certain angle in the axial direction.

The master cylinder may further include an input rod having one end connected to the first piston and the other end connected to the brake pedal, a support plate fixed to the input rod, and a boot having one end supported by the mounting block and the other end supported by the support plate and provided to be stretchable, wherein the support plate includes a vent hole penetrated such that the inside and the outside of the boot communicate with each other, and the vent hole is inclined at a certain angle in the axial direction.

The master cylinder may further include a first sealing member interposed between the one side of the mounting block and the other side of the hydraulic block to seal the hydraulic flow path and the connection flow path, wherein the first sealing member extends along an opening of the connection flow path on the one side of the mounting block or an opening of the hydraulic flow path on the other side of the hydraulic block.

The first sealing member may be provided in a ring shape.

The first sealing member may be inserted into and seated on a first accommodation groove recessed in the other side of the hydraulic block.

The first sealing member may include a first body portion in a center thereof, a first wing portion protruding to an inner side adjacent to the hydraulic flow path on the first body portion, and a second wing portion protruding to an outer side spaced from the hydraulic flow path on the first body portion.

An outer circumferential surface of the second wing portion may be provided to correspond to a shape of an inner surface of the first accommodation groove.

A cross sectional shape of the first body portion may be a circular shape, and a thickness of the second wing portion may be provided to be smaller than a diameter of the first body portion.

The hydraulic block may further include a shaft bore formed therein in the axial direction, the master cylinder may further include a second sealing member interposed between the one side of the mounting block and the other side of the hydraulic block and configured to seal the main bore and the shaft bore, and the second sealing member may extend along an opening of the main bore and an opening of the shaft bore on the other side of the hydraulic block.

The second sealing member may be inserted into and seated on a second accommodation groove recessed in the other side of the hydraulic block.

The second sealing member may include a second body portion provided in a center thereof, a third wing portion protruding to an inner side adjacent to the main bore or the shaft bore on the second body portion, and a fourth wing portion protruding to an outer side spaced apart from the main bore or the shaft bore on the second body portion.

An outer circumferential surface of the fourth wing portion may be provided to correspond to a shape of an inner surface of the second accommodation groove.

A cross-sectional shape of the second body portion may be a circular shape, and a thickness of the fourth wing portion may be provided to be smaller than a diameter of the second body portion.

The sub bore may further include a first stepped portion stepped at one end thereof, and the master cylinder may further include a first bush member inserted into the first stepped portion and configured to guide a reciprocating movement of the first piston.

The master cylinder may further include a damper member of which at least a portion is provided to enter an inside of the first stepped portion.

The main bore may include a first bore in which the first piston is provided to be displaceable, and a second bore formed inside the first bore, provided such that at least a portion of the second piston is displaceable, and having a smaller diameter than a diameter of the first bore, the second bore may include a second stepped portion stepped at the other end facing to the first bore, and the master cylinder may further include a second bush member inserted into the second stepped portion and configured to guide a reciprocating movement of the second piston.

The sub bore may include a third stepped portion stepped at the other end thereof, and the master cylinder may further include a third bush member inserted into the third stepped portion and configured to guide a reciprocating movement of the first piston.

The second bush member may be provided in a ring shape and may include an inner groove recessed in an inner circumferential surface thereof in a circumferential direction.

The first piston may include a body portion extending in the axial direction and a catching portion extending radially from one end of the body portion, and the damper member may have one side supported by the catching portion and the other side facing and being in contact with the first bush member.

The damper member may include a plurality of outer grooves recessed in at least one of one side and the other side thereof.

The mounting block may include a mounting protrusion protruding along a circumference of one end of the sub bore, and an outer circumferential surface of the mounting protrusion and an inner circumferential surface of the main bore may face or be in contact with each other.

The hydraulic block may further include a communication bore allowing the main bore to communicate with the shaft bore, the second piston may include a catching step protruding from an outer circumferential surface thereof, the master cylinder may further include a first stopper provided on an inner circumferential surface of the main bore, caught and supported by the catching step, and having an opening formed on one side thereof, and the communication bore may be positioned inside the opening.

The main bore may further include a first stopper groove recessed in the inner circumferential surface in a circumferential direction, and at least a portion of the first stopper may be inserted into and seated on the first stopper groove.

The first stopper groove may include a separation prevention part protruding from an inner side of the opening.

The master cylinder may further include an input rod having one end connected to the first piston and the other end connected to the brake pedal, a support plate fixed to the input rod, a boot having one end supported by the mounting block and the other end supported by the support plate and provided to be stretchable, and a piston spring having one end supported by the mounting block and the other end supported by the support plate and configured to elastically support the input rod or the first piston, wherein a noise suppression protrusion protruding inward to maintain contact with at least a portion of an outer circumferential surface of the piston spring is provided on an inner circumferential surface of the boot.

The master cylinder may further include a second stopper provided at a portion exposed to an outside of the mounting block on an outer circumferential surface of the first piston, wherein the second stopper includes an accommodation portion through which the first piston passes thereinside and a mounting opening having one open side.

The outer circumferential surface of the first piston may be provided in a circular shape, the accommodation portion may include a first accommodation portion having a first circle center point and a first radius from the first circle center point, and a second accommodation portion having a second circle center point and a second radius from the second circle center point, the second circle center point may be provided to be closer to the mounting opening than the first circle center point, and the second radius may be provided to be smaller than the first radius.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
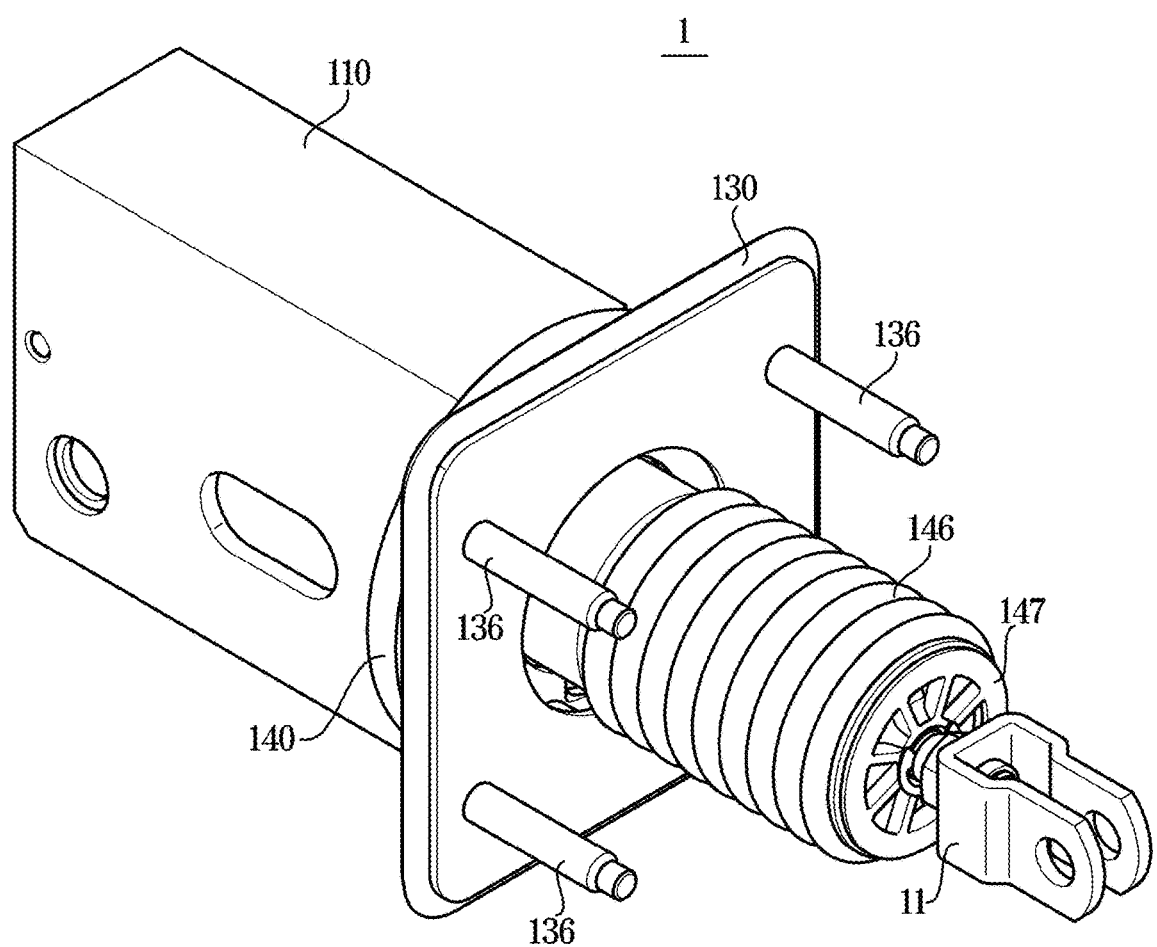
FIG. 1 is a perspective view illustrating a master cylinder according to the present embodiment.

Hereinafter, embodiments of the present disclosure will be described in detail with reference to the accompanying drawings. The following embodiments are presented to sufficiently transfer the spirit of the present disclosure to those skilled in the art to which the present disclosure pertains. The present disclosure is not limited to the embodiments presented herein and may be embodied in other forms. In the drawings, illustration of components irrelevant to the description will be omitted to clarify the present disclosure, and the sizes of the components may be slightly exaggerated to help understanding.

Figure 2:
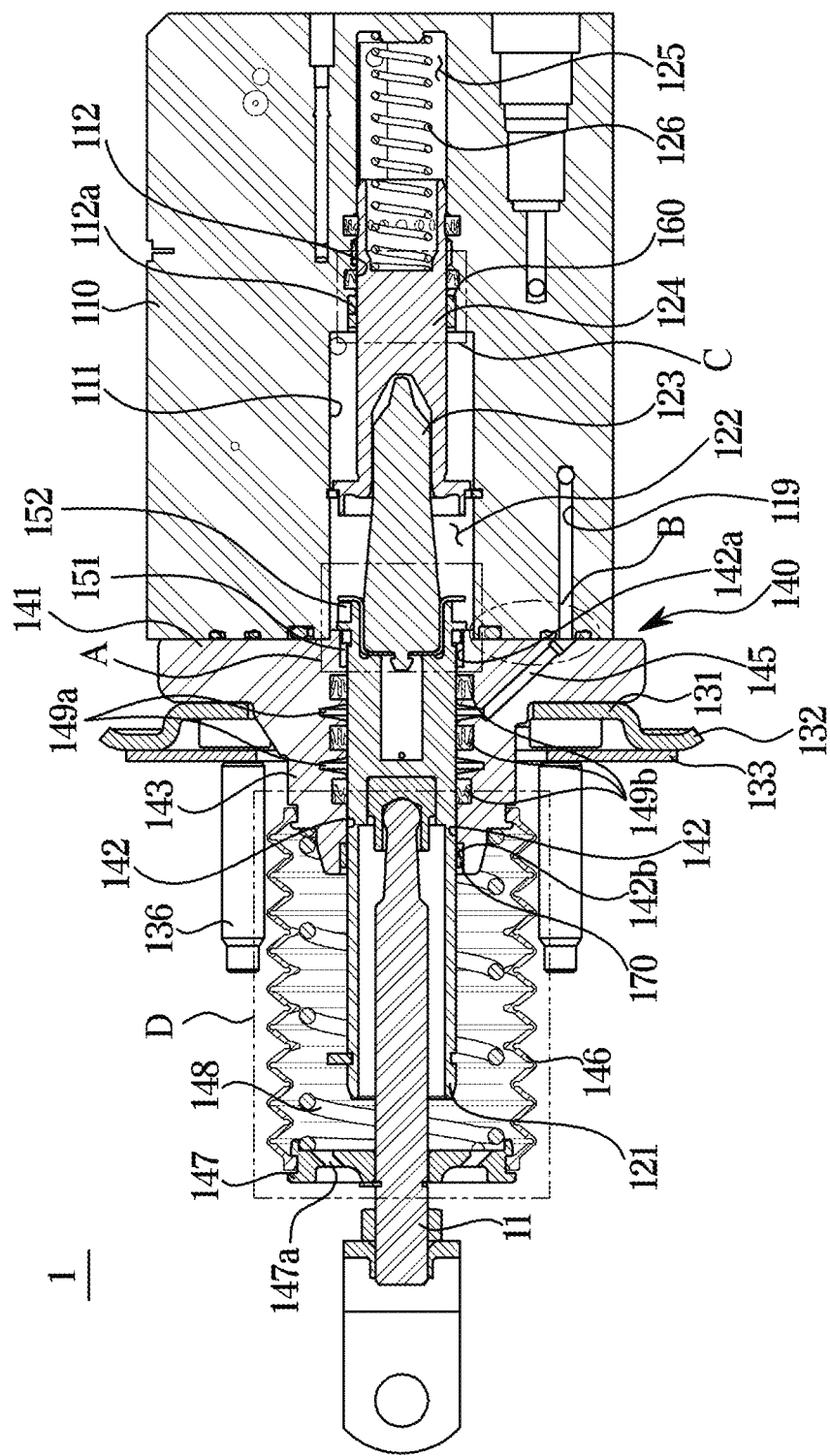
FIG. 2 is a cross-sectional view illustrating the master cylinder according to the present embodiment.
Figure 3:
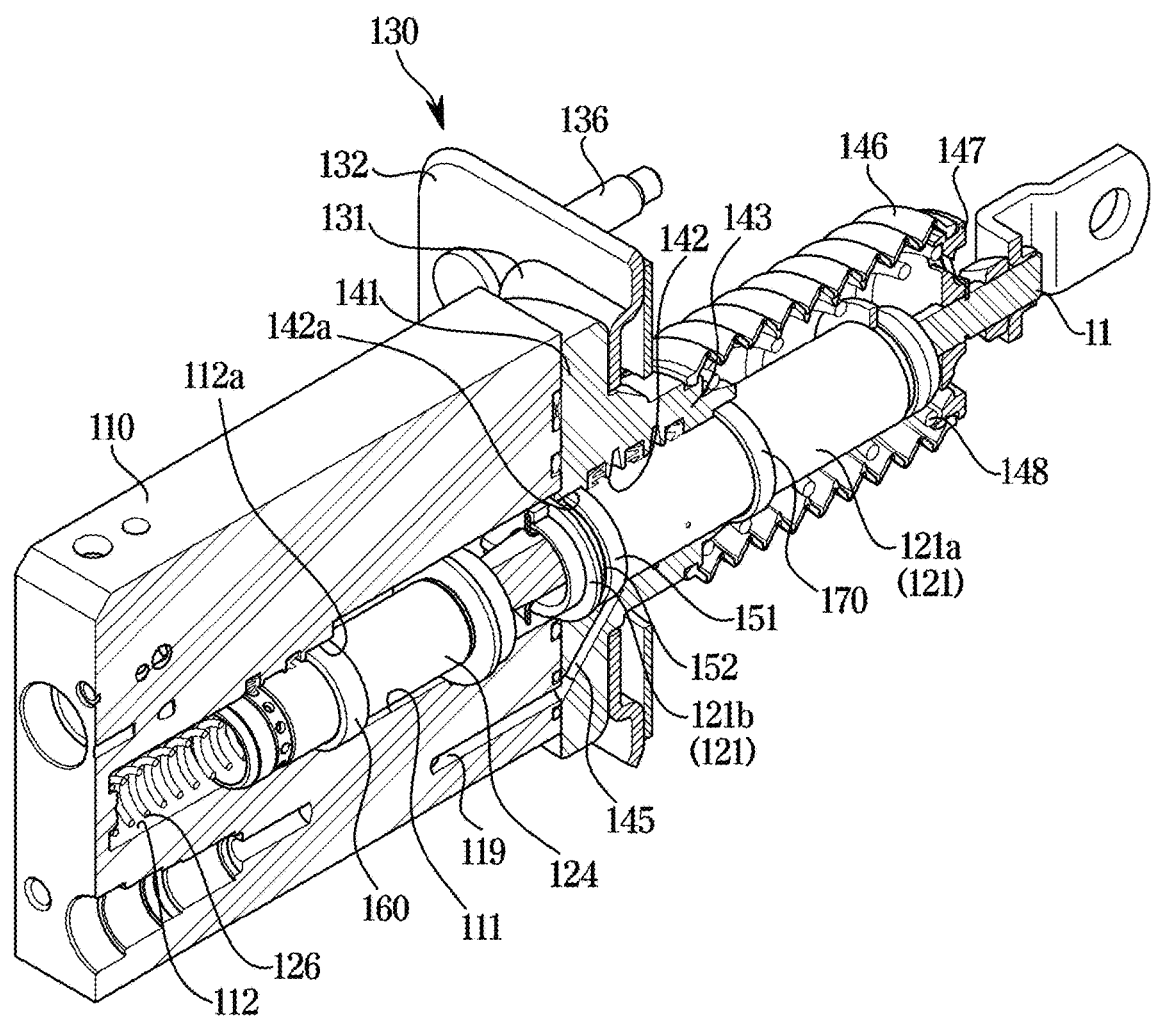
FIG. 3 is a cutaway perspective view illustrating the master cylinder according to the present embodiment.

FIG. 1 is a perspective view illustrating a master cylinder 1 according to the present embodiment, and FIG. 2 is a cross-sectional view illustrating the master cylinder 1 according to the present embodiment. FIG. 3 is a cutaway perspective view illustrating the master cylinder 1 according to the present embodiment.

Referring to FIGS. 1 to 3, the master cylinder 1 according to the present embodiment includes a hydraulic block 110 having main bores 111 and 112 therein in an axial direction, a first piston 121 disposed such that one side is inserted into the main bores 111 and 112 and the other side is exposed to the outside of the hydraulic block 110, a second piston inserted into the main bores 111 and 112 more inside than the first piston 121, an elastic member 123 disposed between the first piston 121 and the second piston 124, a mounting block 140 through which the first piston 121 is inserted and penetrated and which is coupled to the hydraulic block 110, a first sealing member 116 and a second sealing member 177 interposed between the hydraulic block 110 and the mounting block 140 to seal a flow path and prevent a leakage of the pressing medium, a cap 127 provided in the first piston 121, and a gap flow path 100 formed by a gap between the first piston 121 and the cap 127.

The hydraulic block 110 is provided with the main bores 111 and 112 extending in the axial direction and having the other side open (a left side in FIG. 2). The main bores 111 and 112 include a first bore 111 into which one side (a right side in FIG. 2) of the first piston 121, which will be described below, is inserted and which is thus provided displaceably and a second bore 112 which is formed on an inner side (a right side in FIG. 2) of the first bore 111, into which at least a portion of the second piston 124 is inserted, and which is thus provided displaceably. That is, the first bore 111 and the second bore 112 are arranged in series with respect to the axial direction, the first bore 111 is disposed more outside than the second bore 112 on the hydraulic block 110, and the second bore 112 is disposed more inside than the first bore 111 on the hydraulic block 110. A diameter of the second bore 112 may be smaller than a diameter of the first bore 111. Accordingly, as will be described below, the second bore 112 is provided with a second stepped portion 112a formed to be stepped at the other end (a left end in FIG. 2) facing the first bore 111.

The hydraulic block 110 includes various flow paths through which the pressing medium is transported in addition to the main bores 111 and 112 of the master cylinder 1 according to the present embodiment. As an example, a hydraulic flow path 119 may be formed through the other side of the hydraulic block 110, and the hydraulic flow path 119 may be connected to an inspection flow path for inspecting whether the brake device is normally operated, for example, whether there is a leakage of the pressing medium. That is, the hydraulic block 110 may be understood as a valve block constituting a brake system of a vehicle. The hydraulic block 110 may be fixedly supported on a vehicle body by a support bracket 130. Further, as will be described below, the hydraulic block 110 may be provided with a shaft bore 118 through which a shaft 20 of a displacement detection device (not illustrated) that detects displacement of the pedal moves in the axial direction and a communication bore 118a allowing the main bores 111 and 112 to communicate with the shaft bore 118. A detailed description thereof will be made below with reference to FIGS. 20 to 24.

One side (a right side in FIG. 2) of the first piston 121 may be inserted into the first bore 111, and thus the first bore 111 may be provided to be displaceable in the axial direction. The other side of the first piston 121 may be exposed to the outside of the hydraulic block 110 and may be connected to a brake pedal (not illustrated) by means of an input rod 11 through the mounting block 140, which will be described below. The first piston 121 includes a body portion 121a extending in the axial direction and provided in a cylindrical shape and a catching portion 121b extending radially from one end (a right side in FIG. 2) of the body portion 121a. The catching portion 121b may be provided in a state of being accommodated in the first bore 111, and an outer diameter of the catching portion 121b may be provided greater than an inner diameter of a sub bore 142 of the mounting block 140.

Therefore, when the first piston 121 returns (moves in a leftward direction in FIG. 2), the catching portion 121b may be caught by a mounting protrusion 141a of the mounting block 140 and thus disposed at a certain position in a state in which a stepping force is released from the brake pedal. Further, the first piston 121 includes a mounting portion 121d recessed in the axial direction so that the cap 127 and the elastic member 123, which will be described below, are stably coupled to one surface thereof (a right surface in FIG. 2), a hollow portion 121e extending from the mounting portion 121d, a communication hole 121f penetrated in the radial direction to allow the hollow portion 121e to communicate with a connection port 149a, and a stepped surface 121g formed between the mounting portion 121d and the hollow portion 121e as an inner diameter of the mounting portion 121d is greater than an inner diameter of the hollow portion 121e. The gap flow path 100 is formed by a gap between the first piston 121 and the cap 127, and a detailed description thereof will be made below.

At least a portion of the second piston 124 may be inserted into the second bore 112 and may be displaceable in the axial direction. The second piston 124 may be displaced by the first piston 121 and the elastic member 123, which will be described below. A space partitioned by the first piston 121 and the second piston 124, which will be described below, on the first bore 111 may constitute a first liquid pressure chamber 122, and a space partitioned by an inner wall and the second piston 124 on the second bore 112 may constitute a second liquid pressure chamber 125. The second liquid pressure chamber 125 may be provided with a return spring 126 that elastically supports the second piston 124. Further, the compressible and expandable elastic member 123 may be provided between the first piston 121 and the second piston 124, and an elastic restoring force by compression of the elastic member 123 may be provided to a driver as a pedal feel. A fastening protrusion 123a protruding from the other side (the left side in FIG. 2) of the elastic member 123 and coupled to the cap 127, which will be described below, is provided.

The support bracket 130 may be fixedly installed in the vehicle body to support the hydraulic block 110 and the mounting block 140, which will be described below. The support bracket 130 may be provided with a fastening portion 131 coupled to the mounting block 140, which will be described below, and a support portion 132 fixed to the vehicle body by means of a fixed plate 133, the fastening portion 131 and the mounting block 140 may be coupled to each other by a plurality of bolts 136, and the support portion 132 and the vehicle body may be fixedly coupled to each other. The support bracket 130 may be made of a metal material such as steel to ensure sufficient rigidity.

The first piston 121 exposed to the outside from the hydraulic block 110 may be inserted into the mounting block 140, and the mounting block 140 may be provided between the hydraulic block 110 and the support bracket 130 to fix and support the hydraulic block 110. The hydraulic block 110 may be provided with an installation portion 141 having one side (a right side in FIG. 2) coupled to the other side (the left side in FIG. 2) of the hydraulic block 110 and an extension portion 143 extending to the other side (the left side in FIG. 2) and penetrating the support bracket 130.

Further, the mounting block 140 is provided with a sub bore 142 formed through and extending in the axial direction. The sub bore 142 may be provided such that the first piston is inserted thereinto and passes therethrough and thus may be displaced. A first stepped portion 142a that is stepped may be provided at one end (a right end in FIG. 2) of the sub bore 142, and a mounting protrusion 141a protruding axially may be provided at a circumference of one end of the sub bore 142 on the one side (the right surface in FIG. 2) of the installation portion 141. The mounting protrusion 141a is inserted into the first bore 111 of the hydraulic block 110, an outer circumferential surface of the mounting protrusion 141a faces or is in contact with an inner circumferential surface of the first bore 111, and thus, easy mounting and coupling between the hydraulic block 110 and the mounting block 140 can be promoted.

A boot 146 that prevents foreign substances such as dust from being introduced into the sub bore 142 and the hydraulic block 110 may be provided at the other end of the extension portion 143. The boot 146 may have one end supported by the extension portion 143 of the mounting block 140 and the other end supported by the support plate 147 fixedly installed in the input rod 11, and thus may be stretched and expanded according to displacement of the input rod 11. Further, a piston spring 148 that elastically support the input rod 11 and causes return of the first piston 121 may be supported by the other end of the extension portion 143. The piston spring 148 may be disposed inside the boot 146, and a noise suppression protrusion 144 that reduces noise and vibration by operation of the piston spring 148 may be provided between the boot 146 and the piston spring 148. A detailed description thereof will be made below with reference to FIG. 25.

The connection port 149a hydraulically communicating with a reservoir in which the pressing medium is accommodated may be provided in the sub bore 142. At least one seal 149b that prevents leakage of the pressing medium passing through the connection port 149a may be provided on one side and the other side of the connection port 149a. The seal 149b may be seated and accommodated in a seal groove recessed in an inner circumferential surface of the sub bore 142. The connection port 129a may communicate with the first liquid pressure chamber 122 by the gap flow path 100, which will be described below, and a detailed description thereof will be described below with reference to FIGS. 4 to 7.

The mounting block 140 may include a connection flow path 145 allowing the sub bore 142 to communicate with the hydraulic flow path 119 of the hydraulic block 110. The hydraulic flow path 119 of the hydraulic block 110 may be spaced a predetermined distance from the main bores 111 and 112. Accordingly, the connection flow path 145 may have one end exposed to one surface of the installation portion 141 of the mounting block 140 and the other end connected to the sub bore 142 by means of the connection port 149a or the like, and may be formed to be inclined at a certain angle in the axial direction. In the master cylinder 1 according to the present embodiment, the hydraulic block 110 and the mounting block 140 are individually manufactured for easy installation and assembly, and then the other side of the hydraulic block 110 and one side of the mounting block 140 are provided by mutual surface coupling. Accordingly, since it is necessary that the flow path of the hydraulic block 110 and the bore of the mounting block 140 communicate with each other, the connection flow path 145 is inclined by a certain angle in the axial direction and formed through the mounting block 140, and thus flow of the pressing medium can be maintained smoothly A cap 127 that forms the gap flow path 100 to remove residual pressure of the pressing medium present in the first liquid pressure chamber 122 is provided between the first piston 121 and the elastic member 123.

Figure 4:
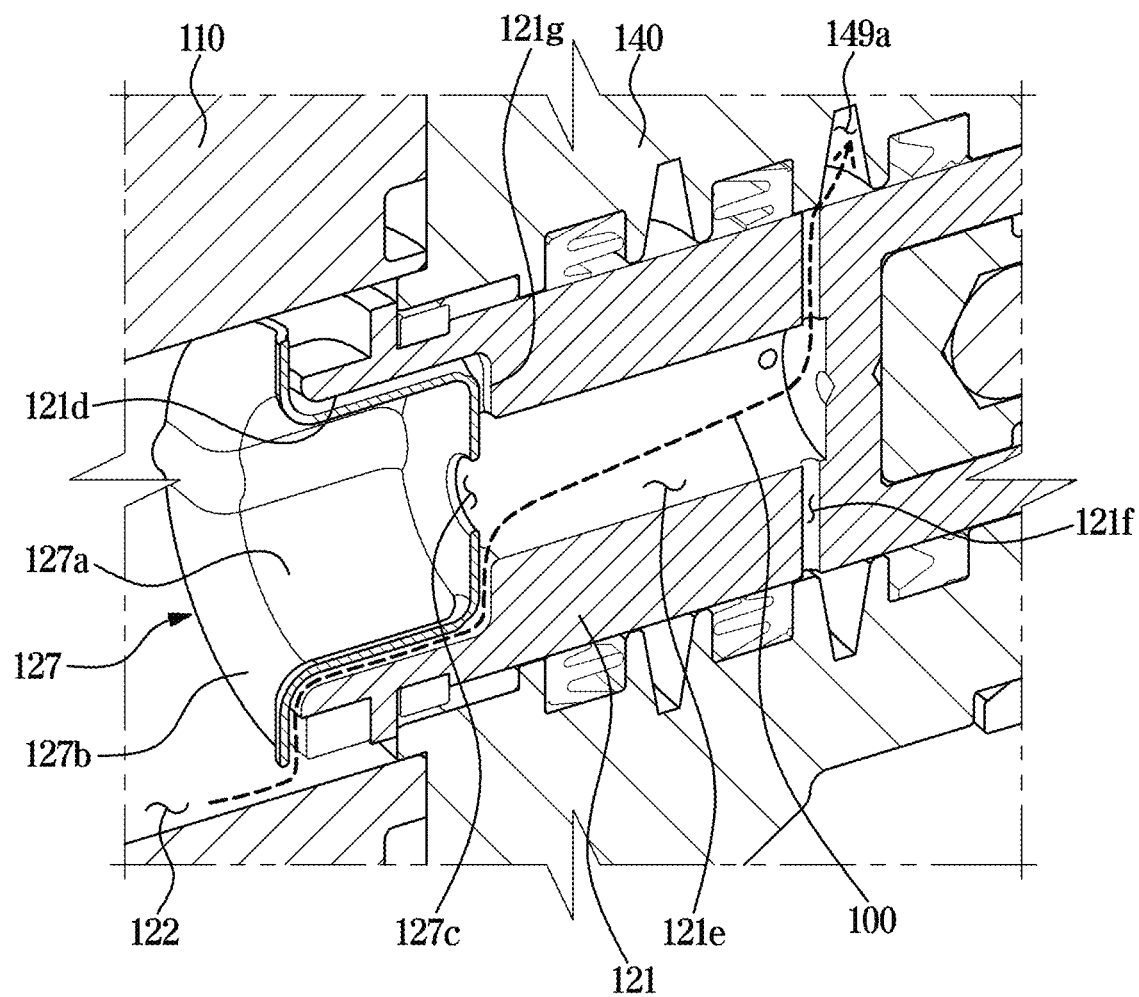
FIG. 4 is a cutaway perspective view illustrating a state in which a cap is provided in a first piston according to the present embodiment.
Figure 5:
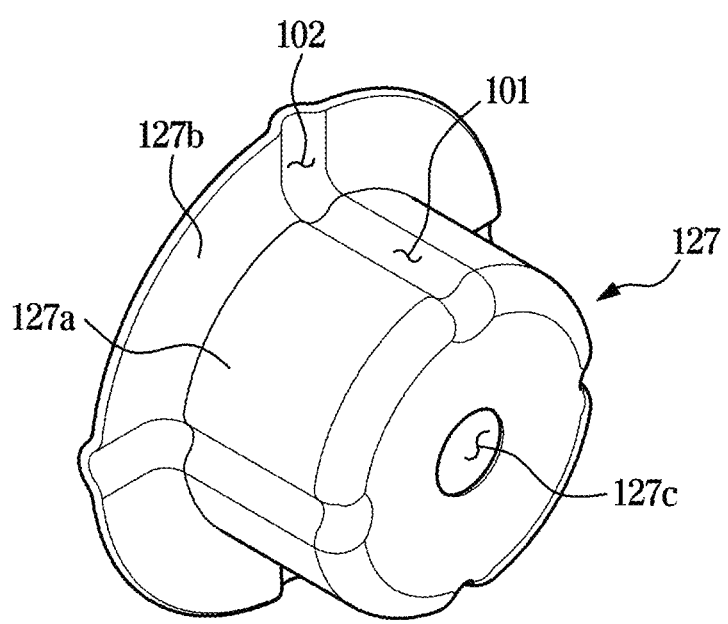
FIG. 5 is a perspective view illustrating a cap according to the present embodiment.
Figure 6:
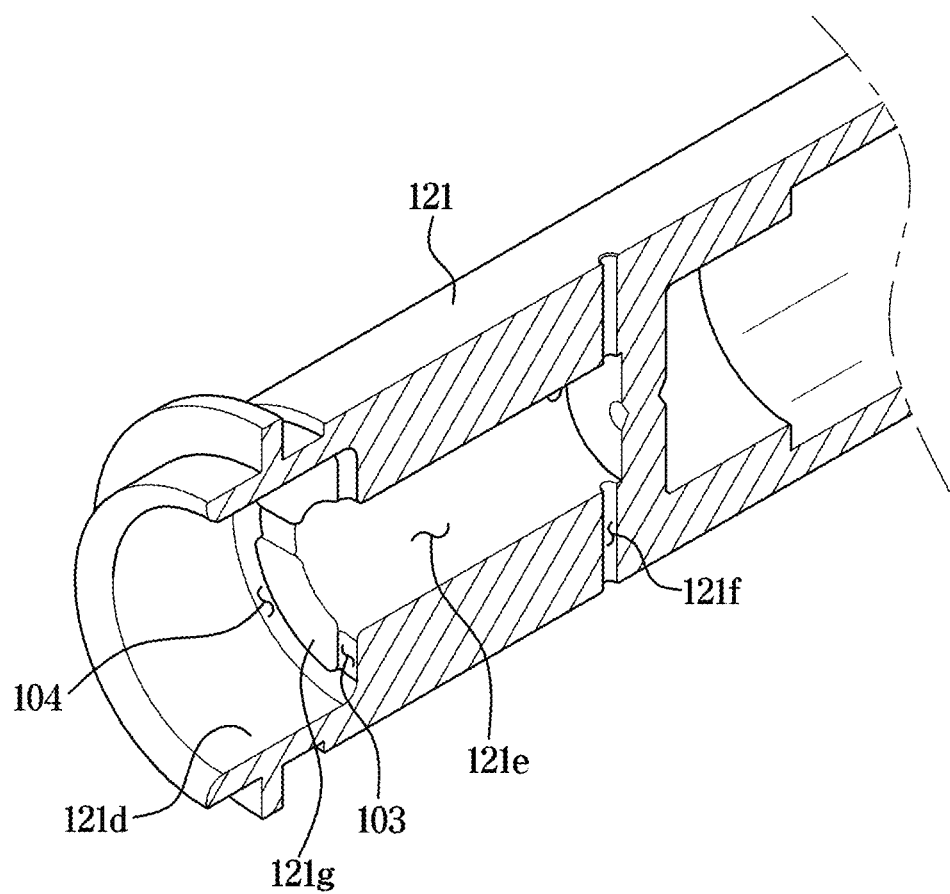
FIG. 6 is a cutaway perspective view illustrating the first piston according to the present embodiment.
Figure 7:
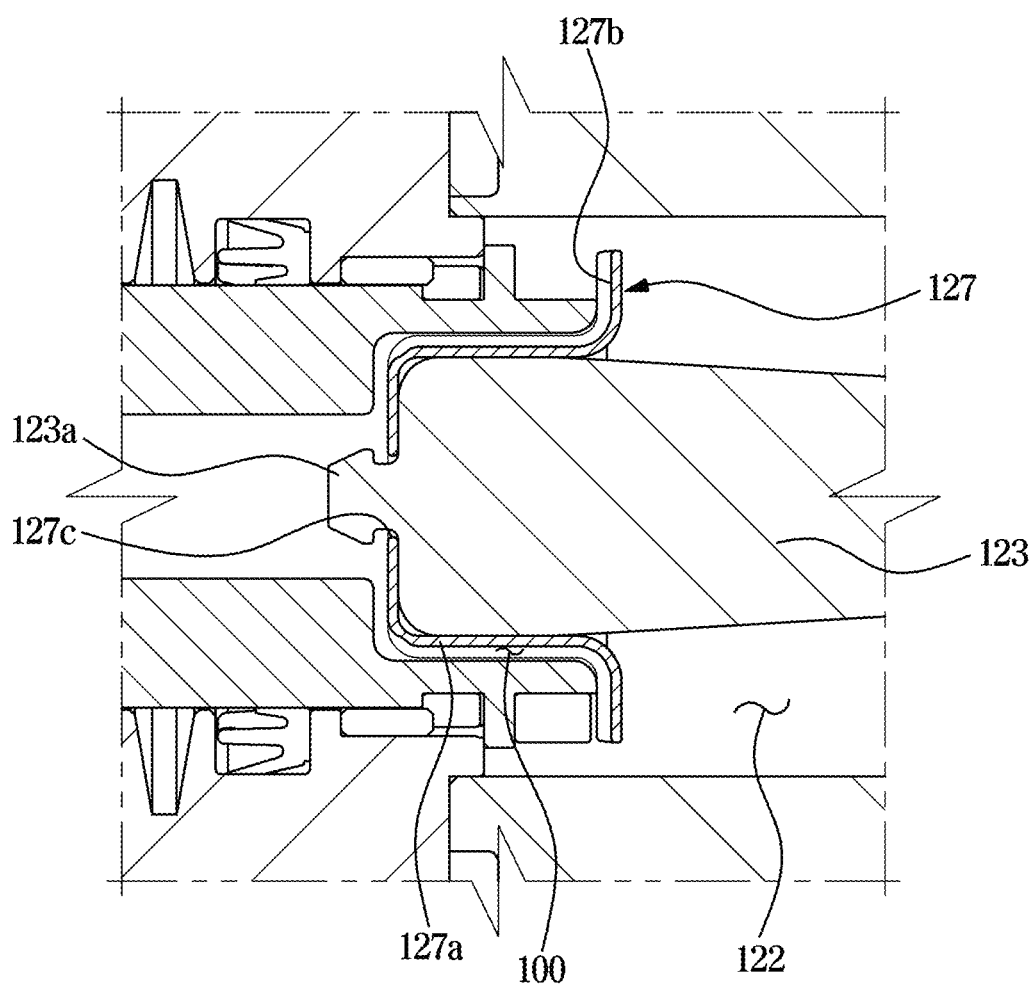
FIG. 7 is an enlarged view illustrating part A of FIG. 2.

FIG. 4 is a cutaway perspective view illustrating a state in which the cap 127 is provided in the first piston 121. Further, FIG. 5 is a perspective view illustrating the cap 127, and FIG. 6 is a cutaway perspective view illustrating the first piston 121. FIG. 7 is an enlarged view illustrating part A of FIG. 2.

Referring to FIGS. 4 to 7, the cap 127 may be interposed between one side (a right side in FIGS. 2 and 7) of the first piston 121 and the other side (a left side in FIGS. 2 and 7) of the elastic member 123. The cap 127 includes a body 127a inserted into the mounting portion 121d, a flange portion 127b extending radially from one end (a right end in FIG. 7) of the body 127a, and a fastening hole 127c into which the fastening protrusion 123a of the elastic member 123 is inserted and mounted.

For stable coupling between the cap 127 and the first piston 121, an outer circumferential surface of the body 127a and an inner circumferential surface of the mounting portion 121d may face or be in contact with each other, and an inside of the body 127a may have a hollow shape so that the elastic member 123 may be easily input therein. The body 127a may be press-fitted to the mounting portion 121d, but the present disclosure is not limited thereto, and the coupling may be performed in various methods.

The gap flow path 100 includes a first slit 101 recessed in the outer circumferential surface of the body 127a in the axial direction, a second slit 102 recessed in the other side of the flange portion 127b facing one end (a right end in FIGS. 2 and 7) of the first piston 121 in the radial direction, and connected to the first slit 101, a third slit 103 recessed in the stepped surface 121g of the first piston 121 and connected to the second slit 102, and a fourth slit 104 recessed in the stepped surface of the first piston 121 in the circumferential direction and connecting the adjacent third slits 103 to each other.

As the second slit 102 is formed on the flange portion 127b, the second slit 102 may hydraulically communicate with the first liquid pressure chamber 122. Further, since the second slit 102 is connected to the first slit 101, the third slit 103, and the fourth slit 104, the first liquid pressure chamber 122 may hydraulically communicate with the connection port 149a by means of a hollow portion 121d and the communication hole 121f. As the connection port 149a is connected to the reservoir (not illustrated), the first liquid pressure chamber 122 and the reservoir may hydraulically communicate with each other through the gap flow path 100.

In description of removing a residual pressure of the pressing medium through the cap 127 and the gap flow path 100, when the vehicle suddenly switches from a normal operation mode of the brake system to a fallback mode due to failure, a liquid pressure of the pressing medium provided by a motor or a pump (not illustrated) of the brake system may be transferred to the first liquid pressure chamber 122 in a moment. Accordingly, the liquid pressure inside the first liquid pressure chamber 122 may not be released, and the residual pressure may remain. In this case, it is difficult for the driver to finely control braking of the vehicle, a stepping force of the brake pedal is affected, and thus the driver may feel sense of difference.

Accordingly, when the residual pressure of the pressing medium remains in the first liquid pressure chamber 122, the gap flow path 100 formed by an interval between the first piston 121 and the cap 127 may discharge the residual pressure of the pressing medium to the reservoir. In detail, the residual pressure of the first liquid pressure chamber 122 may be transferred to the hollow portion 121d inside the first piston 121 while sequentially passing through the second slit 102, the first slit 101, and the third slit 103 of the cap 127, and the pressing medium introduced into the hollow portion 121d may be discharged to the reservoir through the communication hole 121f and the connection port 149a. Therefore, a drag phenomenon and the like can be prevented, and a stroke of the first piston 121 can be also maintained at a certain level.

The first and second sealing members 116 and 117 may be interposed between the hydraulic block 110 and the mounting block 140 to prevent leakage of the pressing medium.

Figure 8:
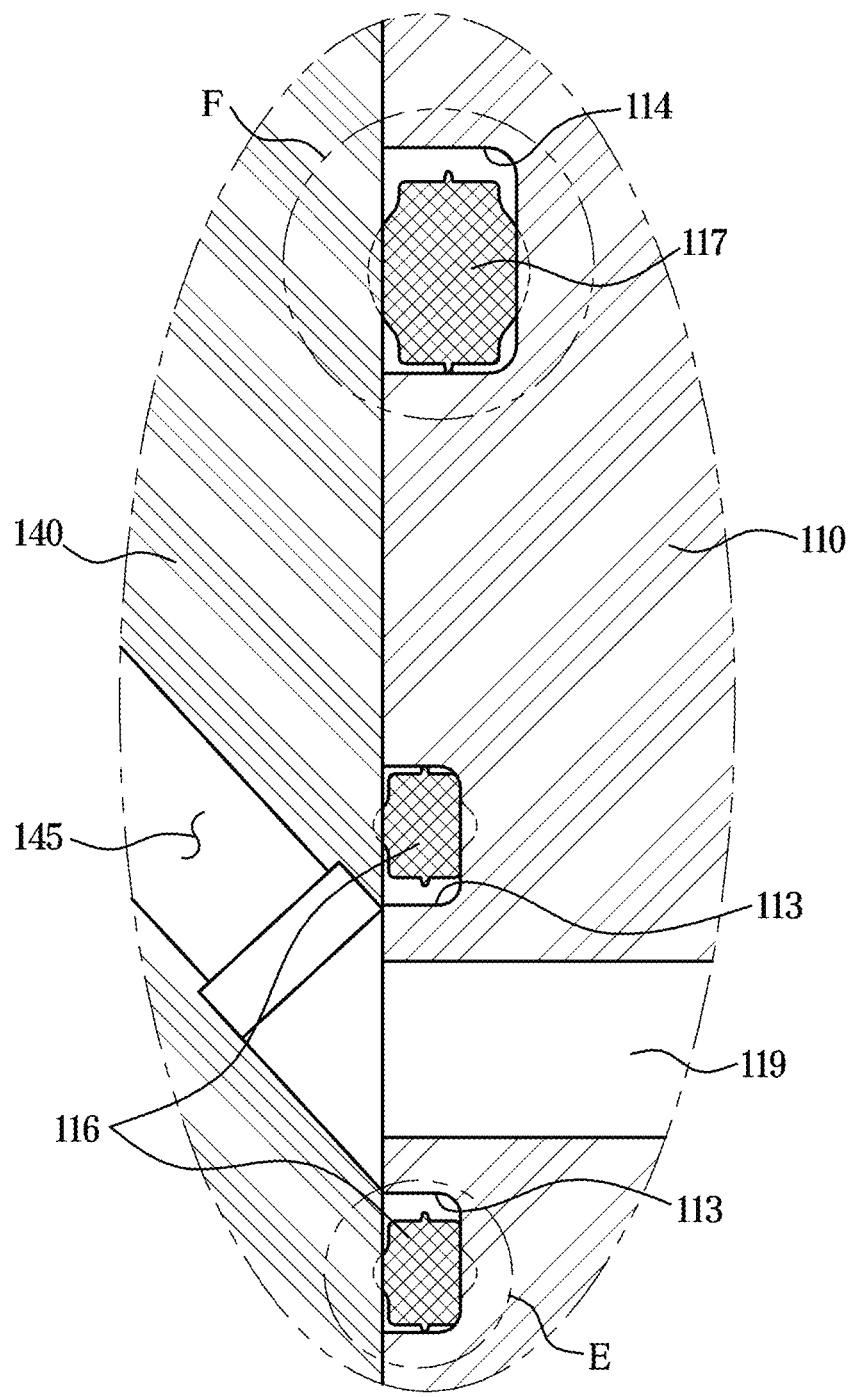
FIG. 8 is an enlarged view illustrating part B of FIG. 2.
Figure 9:
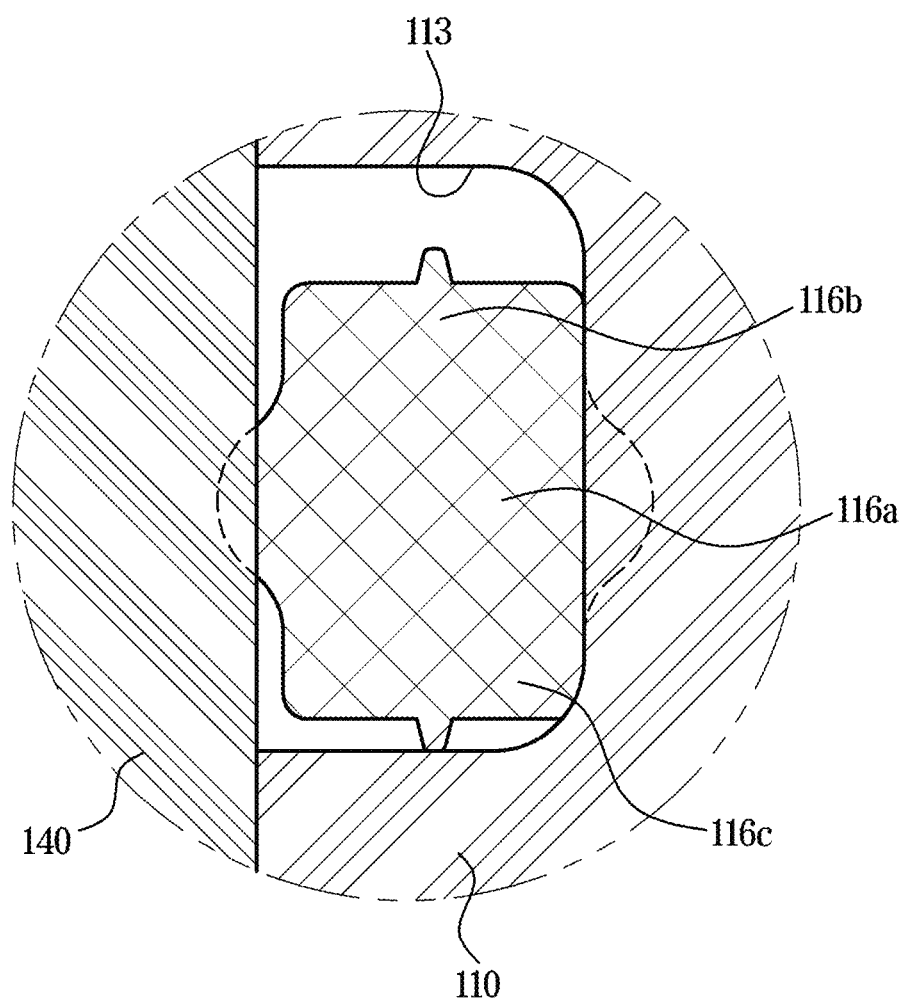
FIG. 9 is an enlarged view of part E of FIG. 8, and is a cross-sectional view of a first sealing member according to the present embodiment.

FIG. 8 is an enlarged view illustrating part B of FIG. 2, and FIG. 9 is an enlarged view illustrating part E of FIG. 8. Referring to FIGS. 2 to 10, the first sealing member 116 may be interposed between the one side (a right surface in FIG. 2) of the mounting block 140 and the other side (a left surface in FIG. 2) of the hydraulic block 110 and is provided to seal the hydraulic flow path 119 of the hydraulic block 110 and the connection flow path 145 of the mounting block 140. The first sealing member 116 may be provided in a ring shape extending along an opening of the connection flow path 145 on one side of the mounting block 140 or an opening of the hydraulic flow path 119 on the other side of the hydraulic block 110. Further, since the first sealing member 116 may be inserted into and seated on a first accommodation groove 113 recessed along the opening of the hydraulic flow path 119 on the other side of the hydraulic block 110, separation of the first sealing member 116 can be prevented even when the high-pressure pressing medium is transferred from the hydraulic flow path 119 or the connection flow path 145.

The first sealing member 116 may be provided with a central first body portion 116a and a first wing portion 116b and a second wing portion 116c on both sides of the first body portion 116a so that the leakage can be effectively prevented even when the high-pressure pressing medium is transferred from the hydraulic flow path 119 or the connection flow path 145.

Figure 10:
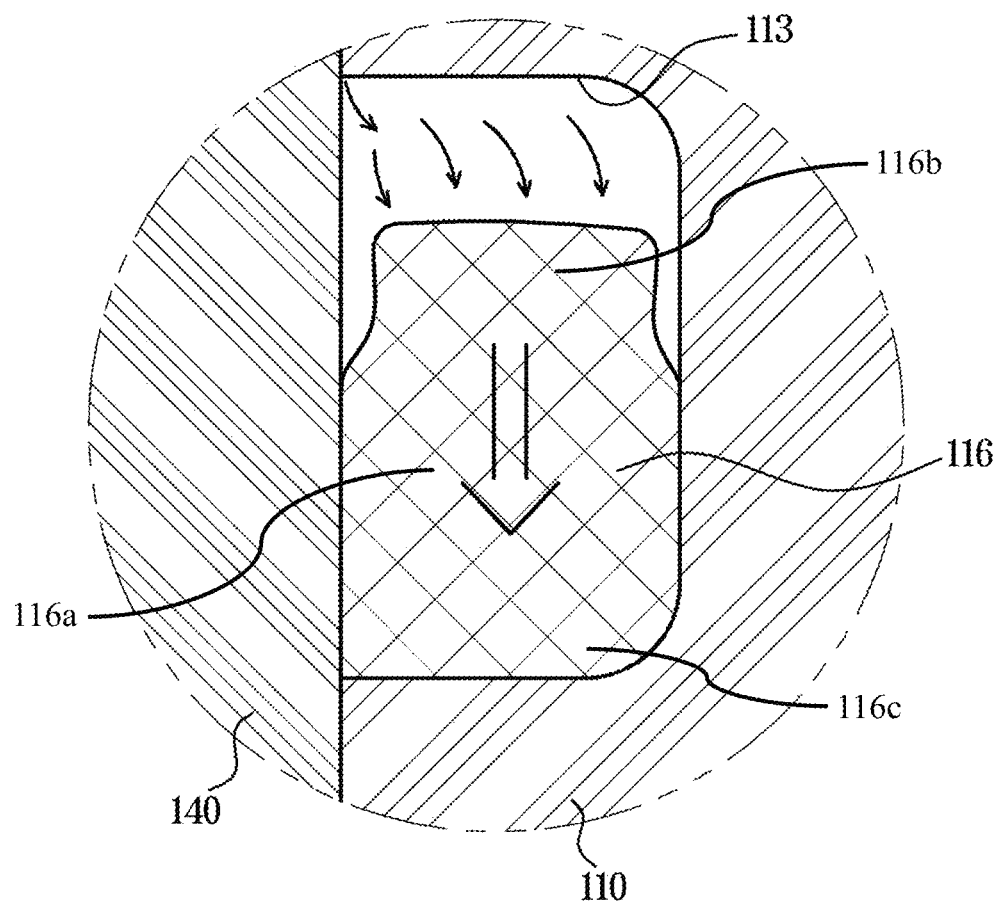
FIG. 10 is a view illustrating a state in which the first sealing member according to the present embodiment is deformed by a liquid pressure of a pressing medium.

FIG. 10 is a view illustrating a state in which the first sealing member 116 is deformed by the liquid pressure of the pressing medium. Referring to FIGS. 9 and 10, the first sealing member 116 may include the first body portion 116a provided in a center thereof and constituting a main body, the first wing portion 116b protruding to the inner side (an upper side in FIGS. 9 and 10) adjacent to the hydraulic flow path 119 on the first body portion 116a, and the second wing portion 116c protruding to the outer side (a lower side in FIGS. 9 and 10) spaced from the hydraulic flow path 119 on the first body portion 116a. An inner circumferential surface of the first wing portion 116b and an outer circumferential surface of the second wing portion 116c, in other words, a portion facing an inner surface of the first accommodation groove 113 may be in surface contact with an inner surface of the first accommodation groove 113 so that the leakage of the pressing medium can be stably prevented even when the high-pressure pressing medium is transferred. To this end, the inner circumferential surface of the first wing portion 116b and the outer circumferential surface of the second wing portion 116c may be provided to correspond to the shape of the inner surface of the first accommodation groove 113. Therefore, as illustrated in FIG. 10, even when the pressing medium is transferred from the hydraulic flow path 119 or the connection flow path 145, a contact area between the outer circumferential surface of the second wing portion 116c and the inner surface of the first accommodation groove 113 increases, and thus the leakage of the pressing medium can be suppressed and prevented more effectively.

Further, for easy deformation of the first wing portion 116b and the second wing portion 116c when the pressing medium is transferred, a thickness (a width in a left-right direction in FIG. 9) of the first wind portion 116b or the second wing portion 116c may be provided to be smaller than a thickness of the first body portion 116a. In detail, the first body portion 116a may be provided in a circular shape in which a cross section becomes greater toward a central portion so that a state in which both sides of the first body portion 116a are in contact with the hydraulic block 110 and the mounting block 140 is maintained in the first accommodation groove 113. The thickness of the first wing portion 116b or the thickness of the second wing portion 116c may be provided to be smaller than a diameter of the first body portion 116a. Therefore, even when the pressing medium is transferred from the hydraulic flow path 119 or the connection flow path 145, the first body portion 116a primarily seals a gap between the hydraulic block 110 and the mounting block 140, the first wing portion 116b or the second wing portion 116c is secondarily and easily deformed, the contact area with the first accommodation groove 113 is quickly expanded, and thus the leakage of the pressing medium can be prevented stably.

Figure 11:
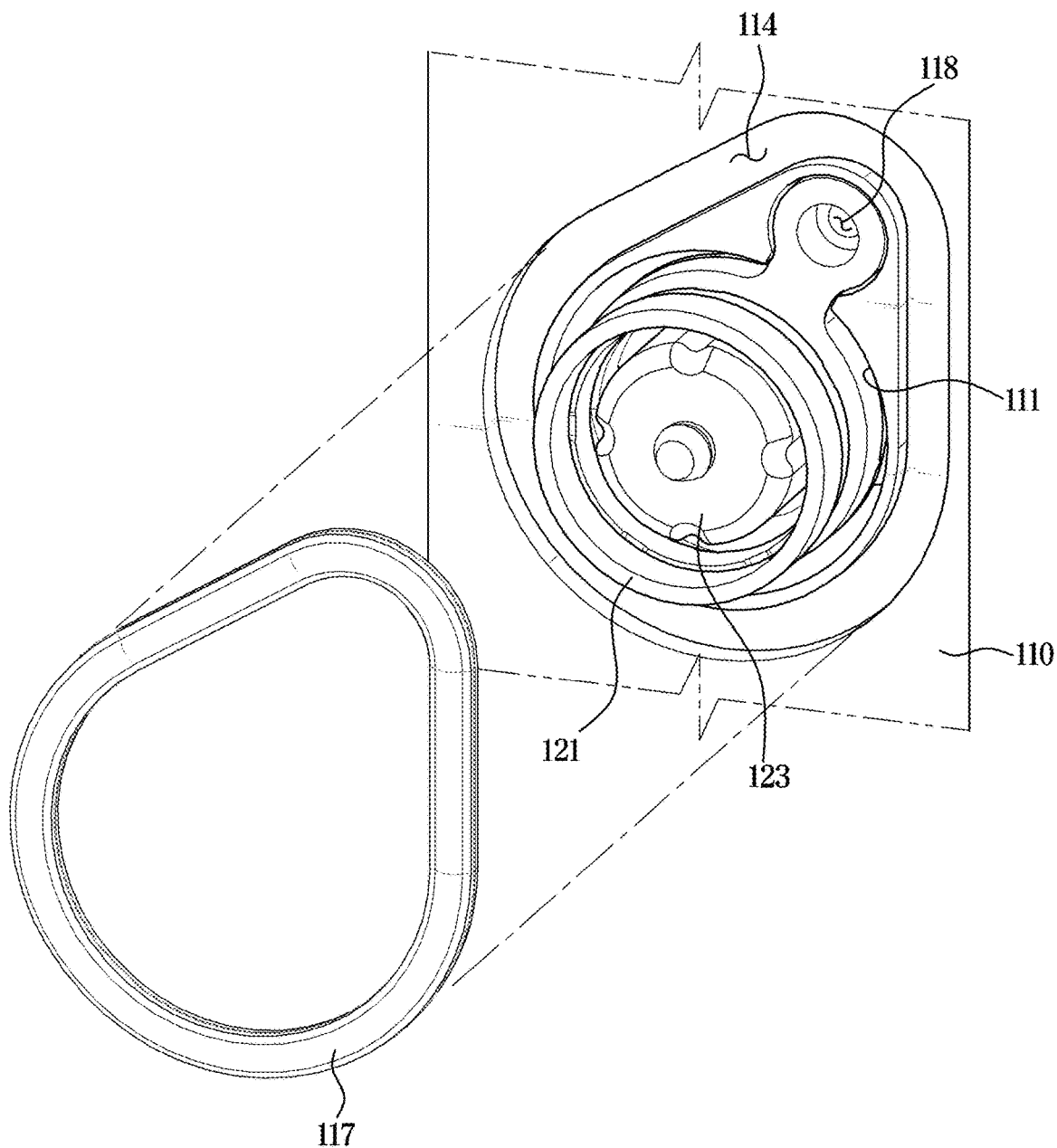
FIG. 11 is an exploded perspective view illustrating a second sealing member according to the present embodiment.
Figure 12:
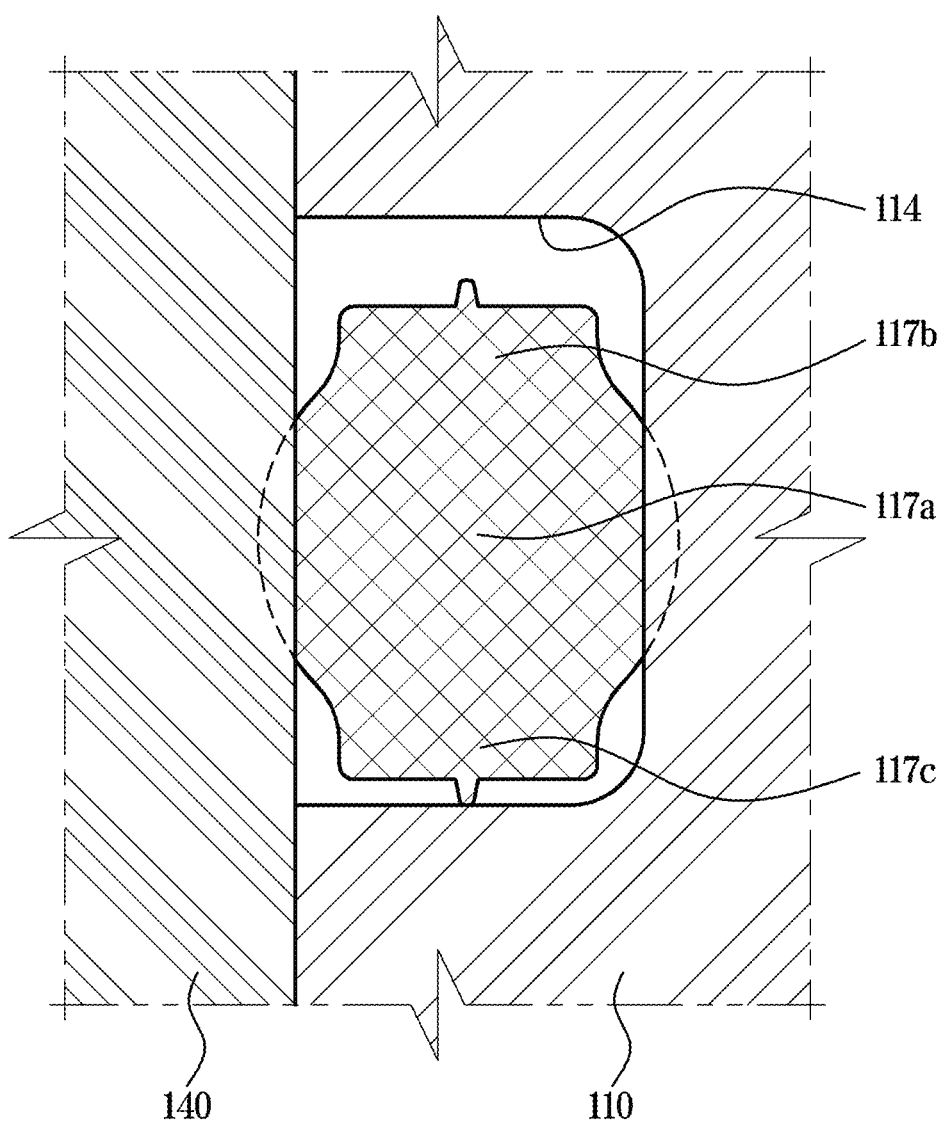
FIG. 12 is an enlarged view of part F of FIG. 8, and is a cross-sectional view of a second sealing member according to the present embodiment.

FIG. 11 is an exploded perspective view illustrating the second sealing member 117 according to the present embodiment, and FIG. 12 is an enlarged view illustrating part F of FIG. 8. Referring to FIGS. 2, 11, and 12, the second sealing member 117 may be interposed between the one side (a right surface in FIG. 2) of the mounting block 140 and the other side (a left surface in FIG. 2) of the hydraulic block 110 and is provided to seal the main bores 111 and 112 and the shaft bore 118 of the hydraulic block 110.

The shaft bore 118 may be spaced a predetermined distance from the main bores 111 and 112 on the hydraulic block 110, may extend in the axial direction, and may be disposed so that the shaft 20 (not illustrated) of the displacement detection device of the brake pedal may be displaced. The communication bore 118a in which a connection member connecting the first piston 121 and the shaft 20 is accommodated may be formed between the main bores 111 and 112 and the shaft bore 118 to extend in the axial direction (See FIGS. 20 and 19).

The second sealing member 117 may extend along openings of the main bores 111 and 112 and an opening of the shaft bore 118 on the other side of the hydraulic block 110. Further, the second sealing member 117 may be inserted into and seated on a second accommodation groove 114 recessed along the openings of the main bores 111 and 112 and the opening of the shaft bore 118 on the other side of the hydraulic block 110. Therefore, even when the high-pressure pressing medium is transferred from the main bores 111 and 112 or the shaft bore 118, separation of the second sealing member 117 can be prevented.

The second sealing member 117 may be provided with a central second body portion 117a and a third wing portion 117b and a fourth wing portion 117c on both sides of the second body portion 117a so that the leakage can be effectively prevented even when the high-pressure pressing medium is transferred from the hydraulic flow path 119 or the connection flow path 145.

The second sealing member 117 may include the second body portion 117a provided in a center thereof and constituting a main body, the third wing portion 117b protruding to an inner side (an upper side in FIG. 12) from the main bores 111 and 112 or the shaft bore 118 on the second body portion 117a, and the fourth wing portion 117c protruding to the outer side (a lower side in FIG. 12) spaced apart from the main bores 111 and 112 or the shaft bore 118 on the second body portion 117a. An inner circumferential surface of the third wing portion 117b and an outer circumferential surface of the fourth wing portion 117c, in other words, a portion facing an inner surface of the second accommodation groove 114 may be in surface contact with the second accommodation groove 114 so that the leakage of the pressing medium can be stably prevented even when the high-pressure pressing medium is transferred. To this end, the inner circumferential surface of the third wing portion 117b and the outer circumferential surface of the fourth wing portion 117c may be provided to correspond to the shape of the inner surface of the second accommodation groove 114. Therefore, similar to the first sealing member 116 illustrated in FIG. 10, even when the pressing medium is transferred from the main bores 111 and 112 or the shaft bore 118, a contact area between the outer circumferential surface of the fourth wing portion 117c and the inner surface of the second accommodation groove 114 increases, and thus the leakage of the pressing medium can be suppressed and prevented more effectively.

Further, for easy deformation of the third wing portion 117b and the fourth wing portion 117c when the pressing medium is transferred, a thickness (a width in a left-right direction in FIG. 12) of the third wind portion 117b or the fourth wing portion 117c may be provided to be smaller than a thickness of the second body portion 117a. In detail, the second body portion 117a may be provided in a circular shape in which a cross section becomes greater toward a central portion so that a state in which both sides of the second body portion 117a are in contact with the hydraulic block 110 and the mounting block 140 is maintained in the second accommodation groove 114. The thickness of the third wing portion 117b or the thickness of the fourth wing portion 117c may be provided to be smaller than a diameter of the second body portion 117a. Therefore, even when the pressing medium is transferred from the main bores 111 and 112 or the shaft bore 118, the second body portion 117a primarily seals a gap between the hydraulic block 110 and the mounting block 140, the third wing portion 117b or the fourth wing portion 117c is secondarily and easily deformed, the contact area with the second accommodation groove 114 is quickly expanded, and thus the leakage of the pressing medium can be prevented stably.

A bush member is provided to guide a smooth reciprocating movement of the first piston 121 and the second piston 124, and at the same time, to prevent excessive friction and scratches between a piston and a bore.

Figure 13:
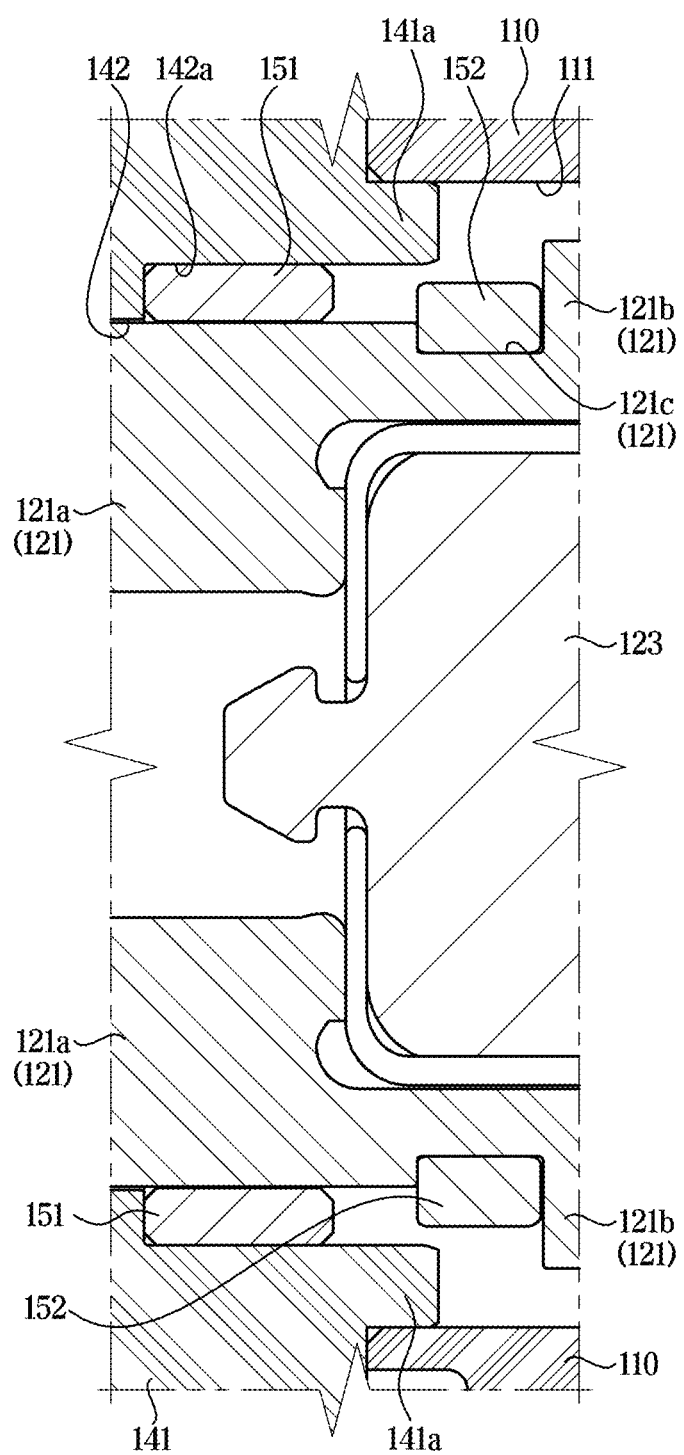
FIGS. 13 and 14 are enlarged views of part A of FIG. 2 and shows states in which the first piston according to the present embodiment moves forward and returns to an original position.
Figure 14:
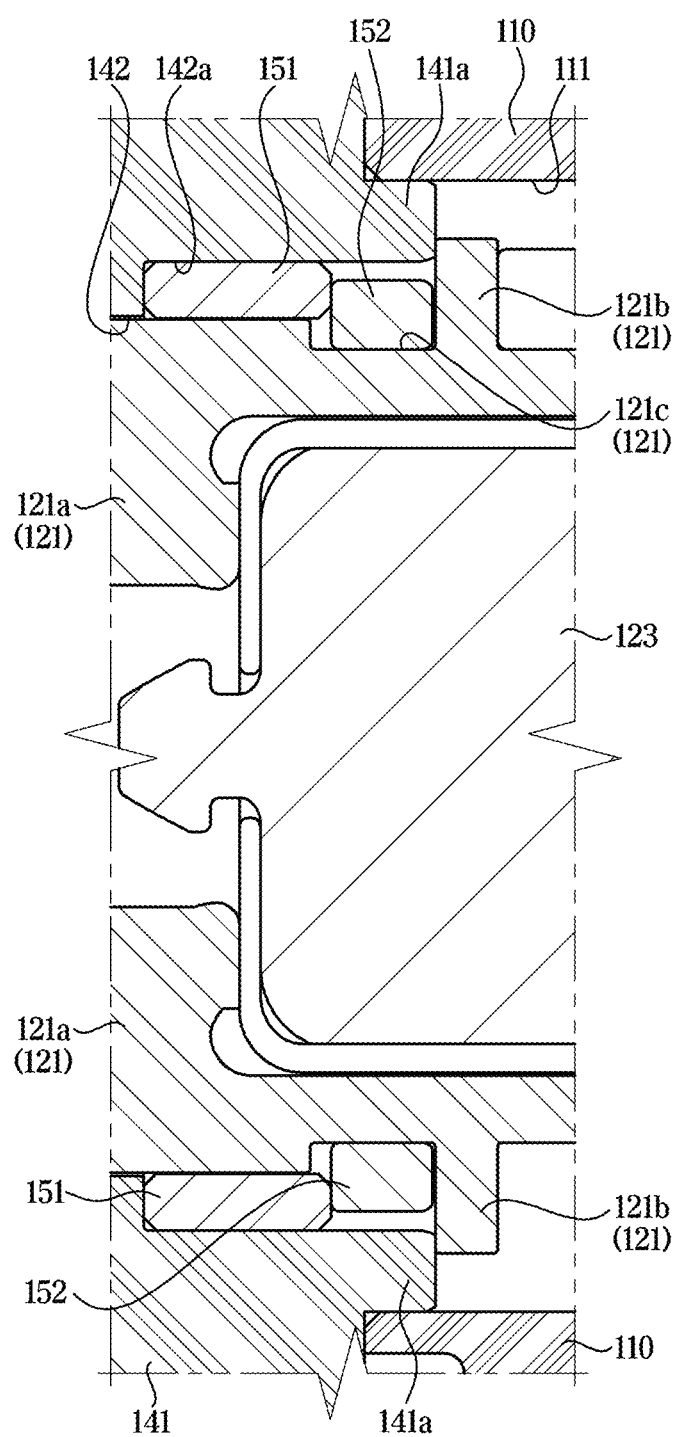
Figure 15:
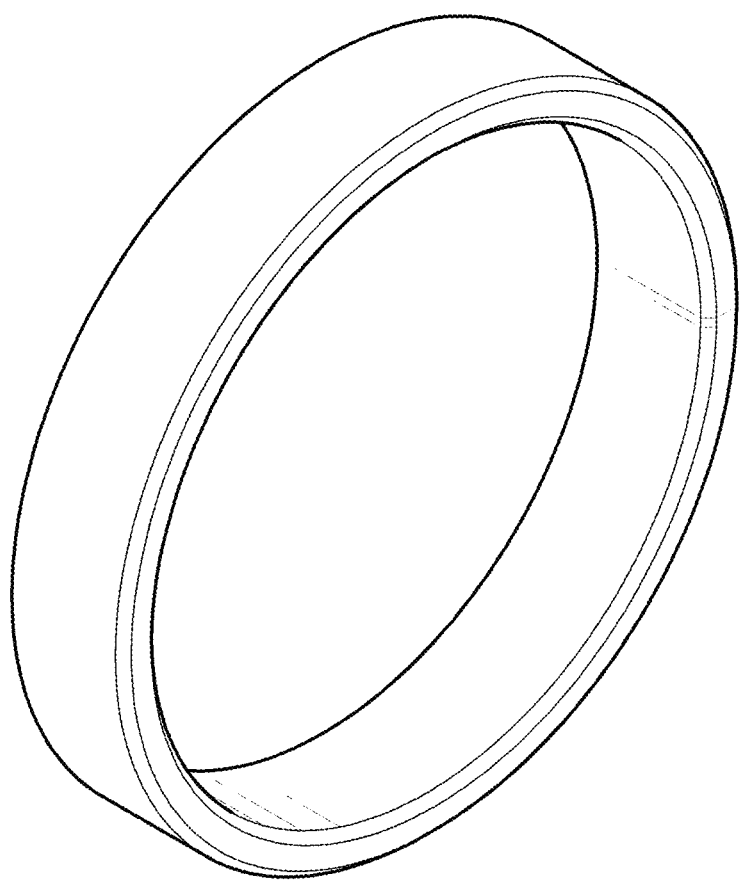
FIG. 15 is a perspective view illustrating a first bush member according to the present embodiment.
Figure 16:
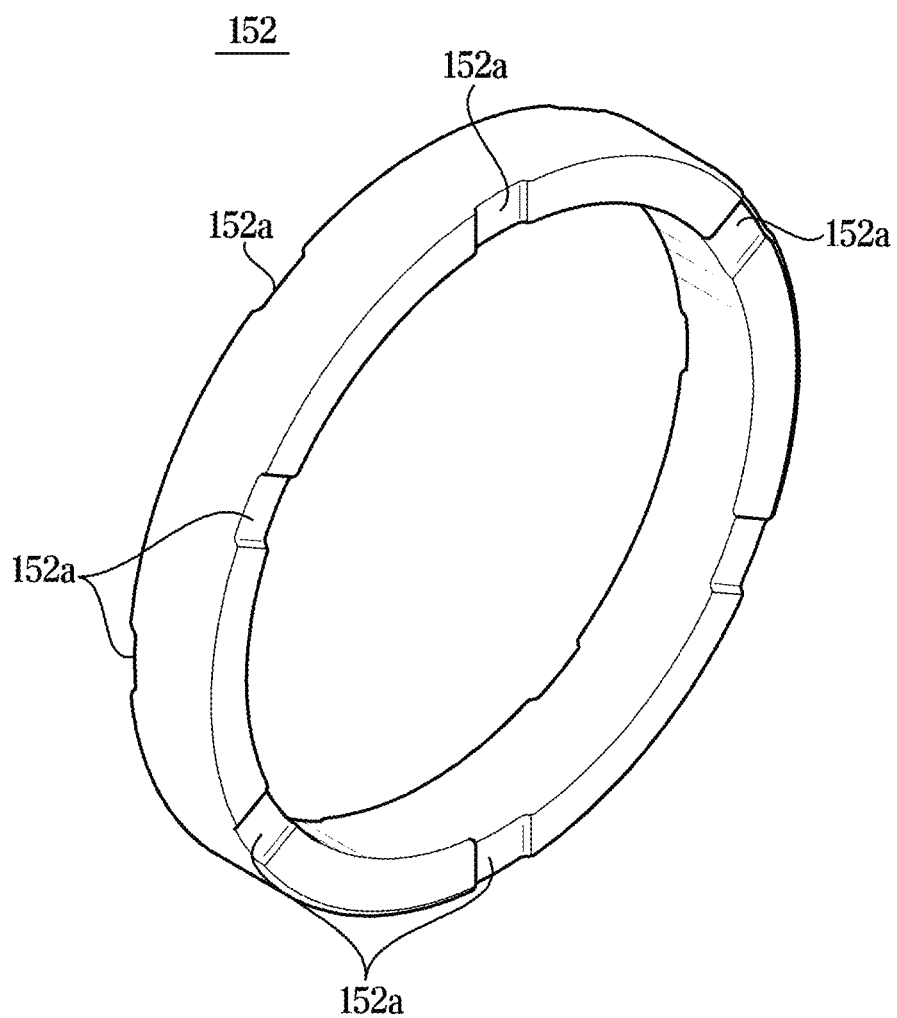
FIG. 16 is a perspective view illustrating a damper member according to the present embodiment.

FIGS. 13 and 14 are enlarged views of part A of FIG. 2, FIG. 15 is a perspective view illustrating a first bush member 151, and FIG. 16 is a perspective view illustrating a damper member 152.

Referring to FIGS. 2, 3, and 13 to 16, the first bush member 151 is provided to be adjacent to the one side (a right side in FIGS. 2, 13, and 14) of the first piston 121, guides a forward movement and a return movement to promote stable sliding of the first piston 121, and at the same time, prevents wear and damage due to contact with the mounting block 140. The first stepped portion 142a that is stepped and has a greater inner diameter than an inner diameter of the sub bore 142 may be provided at one end (a right end in FIGS. 13 and 14) of the sub bore 142, and thus the first bush member 151 may be provided in a ring shape, and an outer circumferential surface of the first bush member 151 may be provided in contact with an inner circumferential surface of the first stepped portion 142a. An outer circumferential surface of the first bush member 151 may be press-fitted to the inner circumferential surface of the first stepped portion 142a to stably support the first bush member 151 and prevent separation of the first bush member 151 on the first stepped portion 142a. The first bush member 151 may be made of a plastic material, and a diameter of an inner circumferential surface of the first bush member 151 may be provided to correspond to a diameter of an outer circumferential surface of the body portion 121a of the first piston 121.

When the first piston 121 returns (moves in a left direction in FIGS. 2, 13, and 14), the damper member 152 prevents noise and vibration caused by impact between the first piston 121 and the mounting block 140. The damper member 152 may be disposed adjacent to one end (a right end in FIGS. 13 and 14) on the outer circumferential surface of the first piston 121 and may be made of an elastically deformable material to alleviate the impact caused by contact between the first piston 121 and the mounting block 140. The damper member 152 may be retracted into and in close contact with a damper groove recessed in the outer circumferential surface of the first piston 121 in the circumferential direction so that the damper member 152 is stably supported on the first piston 121 and separation therebetween is prevented. Further, the damper member 152 may have one side (a right side in FIGS. 13 and 14) supported by a catching portion 121b of the first piston 121 and the other side (a left side in FIGS. 13 and 14) provided to face and be in contact with the first bush member 151. The damper member 152 may enter the inside of the first stepped portion 142a according to the reciprocating movement of the first piston 121. The damper member 152 may be provided with an outer groove 152a recessed in at least one of one side and the other side so that compression and restoration can be easily and quickly performed.

The second bush member 160 is provided to guide a reciprocating movement of the second piston 124, and at the same time, to prevent wear and damage caused by contact with the hydraulic block 110.

Figure 17:
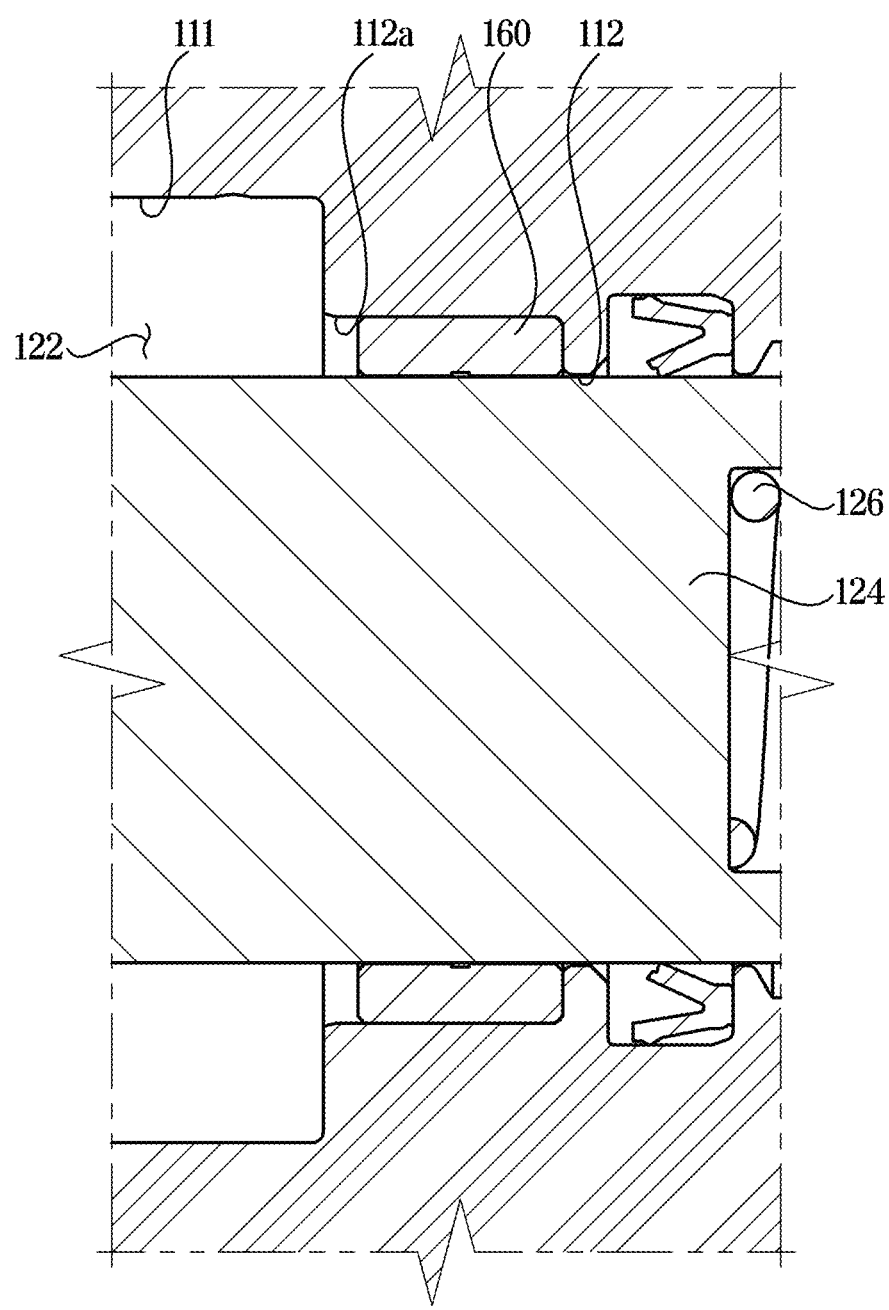
FIG. 17 is an enlarged view illustrating part C of FIG. 2.
Figure 18:
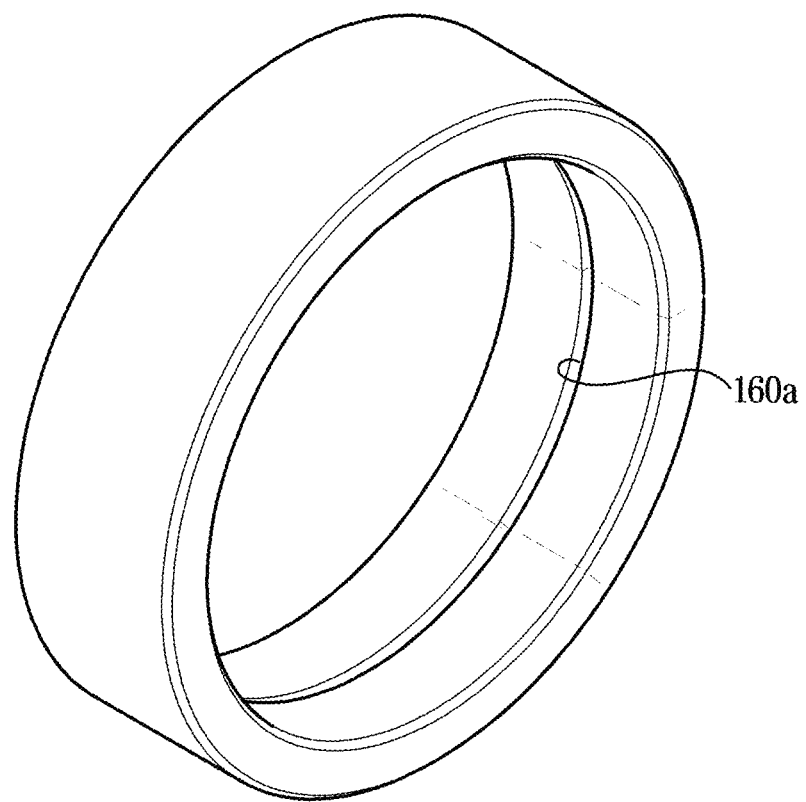
FIG. 18 is a perspective view illustrating a second bush member according to the present embodiment.

FIG. 17 is an enlarged view illustrating part C of FIG. 2, and FIG. 18 is a perspective view illustrating the second bush member 160.

Referring to FIGS. 2, 3, 17, and 18, the second bush member 160 may be provided between the second piston 124 and the second bore 112. The second stepped portion 112a that is stepped and has a greater inner diameter than an inner diameter of the second bore 112 may be provided at the other end (a left end in FIG. 17) of the second bore 112, and thus the second bush member 160 may be provided in a ring shape and may be provided such that an outer circumferential surface thereof is in contact with an inner circumferential surface of the second stepped portion 112a. The outer circumferential surface of the second bush member 160 may be press-fitted to the inner circumferential surface of the second stepped portion 112a so that the second bush member 160 may be stably supported on the second stepped portion 112a and separation therebetween may be prevented. The second bush member 160 may be made of a plastic material, and a diameter of an inner circumferential surface of the second bush member 160 may be provided to correspond to a diameter of an outer circumferential surface of the second piston 124. Further, the second bush member 160 may include an inner groove 160a recessed in the circumferential direction in the inner circumferential surface thereof to promote smooth sliding of the second piston 124. Direct friction between the second piston 124 and the hydraulic block 110 can be reduced by the second bush member 160, scratches and damages can be prevented, and durability of a product can be improved.

A third bush member 170 is provided adjacent to the other side (a left side in FIG. 2) of the first piston 121 and is provided to guide the reciprocating movement of the first piston 121, and at the same time, to prevent wear and damage caused by contact with the mounting block 140.

Figure 19:
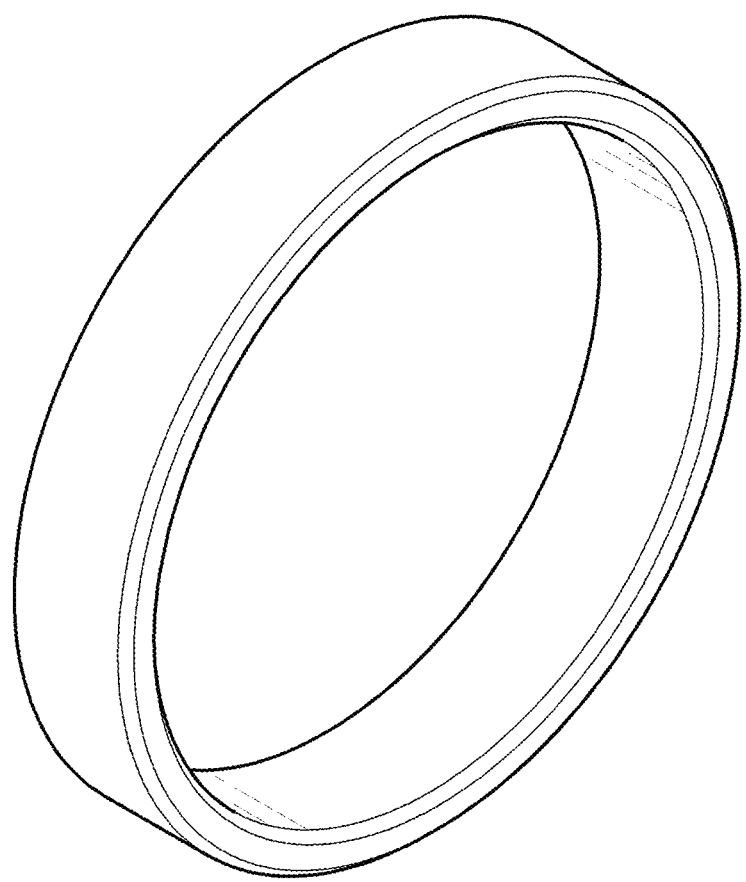
FIG. 19 is a perspective view illustrating a third bush member according to the present embodiment.

FIG. 19 is a perspective view illustrating the third bush member 170, and referring to FIGS. 2 and 19, a third stepped portion 142b that is stepped and has a greater inner diameter than an inner diameter of the sub bore 142 is provided at the other end (a left end in FIG. 2) of the sub bore 142, and the third bush member 170 may be inserted into and installed in the third stepped portion 142b. Like the first bush member 151, the third bush member 170 may be provided in a ring shape and provided in contact with an inner circumferential surface of the third stepped portion 142b. An outer circumferential surface of the third bush member 170 may be press-fitted to the inner circumferential surface of the third stepped portion 142b to stably support the third bush member 170 and prevent separation of the third bush member 170 on the third stepped portion 142b. The third bush member 170 may be made of a plastic material, a diameter of an inner circumferential surface of the third bush member 170 may be provided to correspond to the diameter of the outer circumferential surface of the body portion 121a of the first piston 121.

Figure 20:
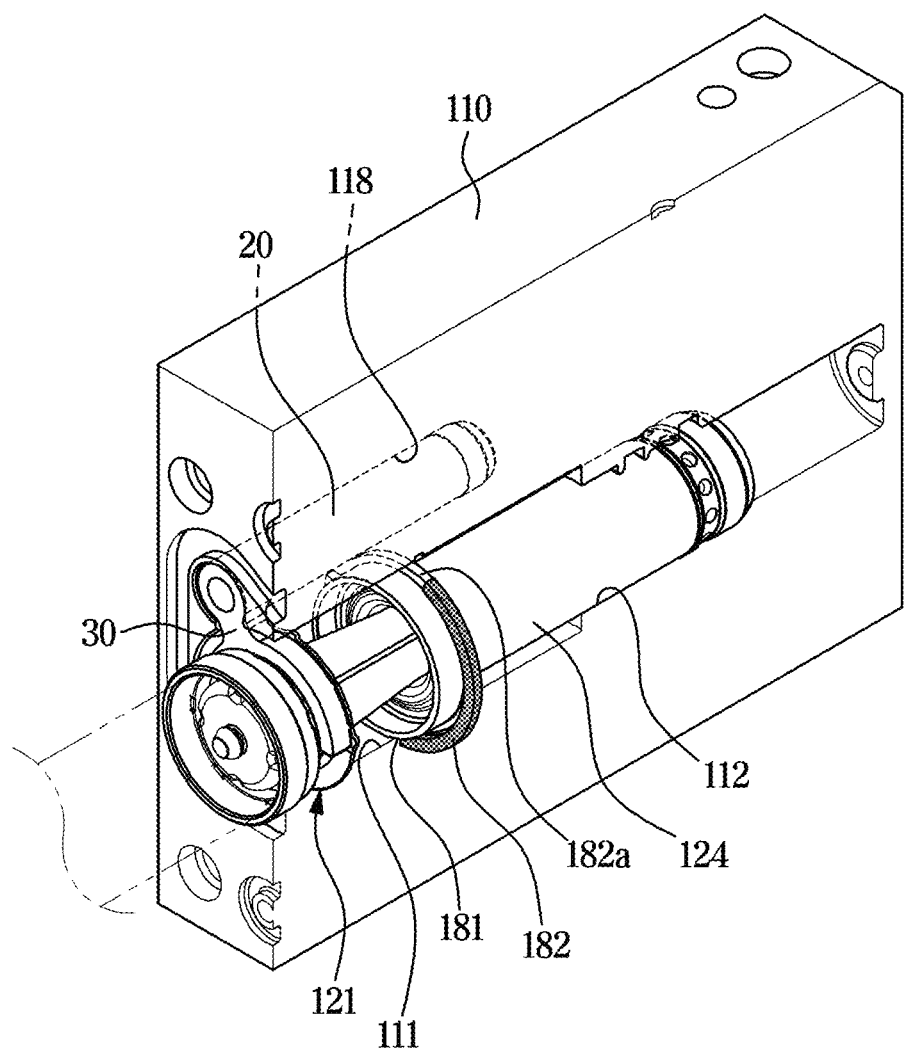
FIG. 20 is a cutaway perspective view illustrating the master cylinder according to the present embodiment.
Figure 21:
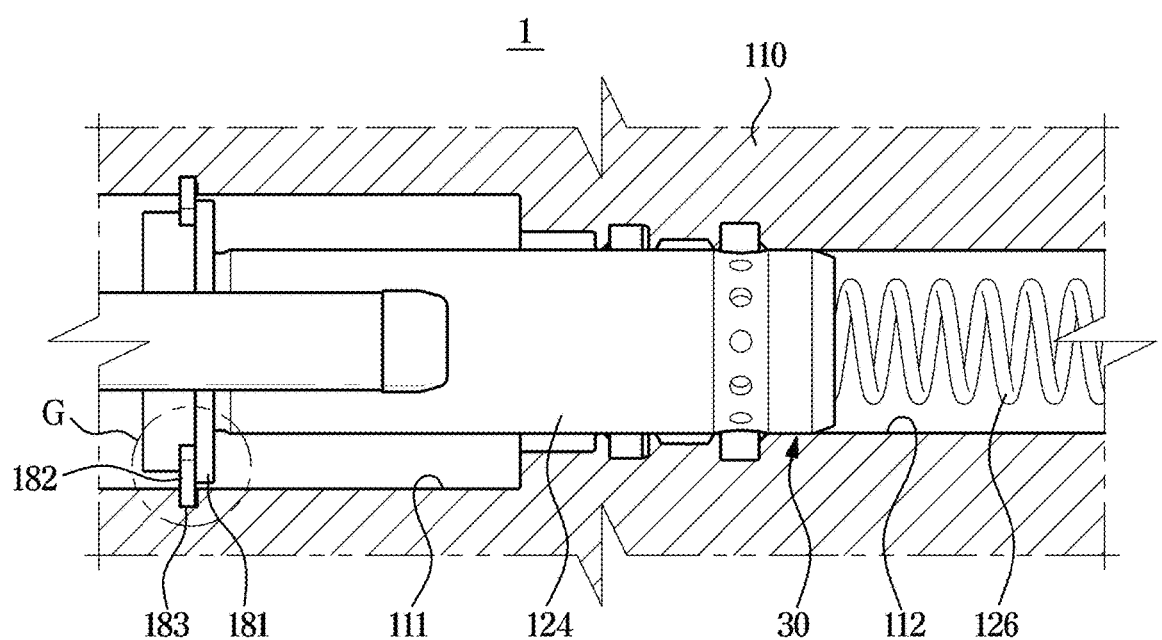
FIG. 21 is a lateral cross-sectional view illustrating the master cylinder according to the present embodiment and shows a state in which a catching step is caught and supported by a firsts stopper.
Figure 22:
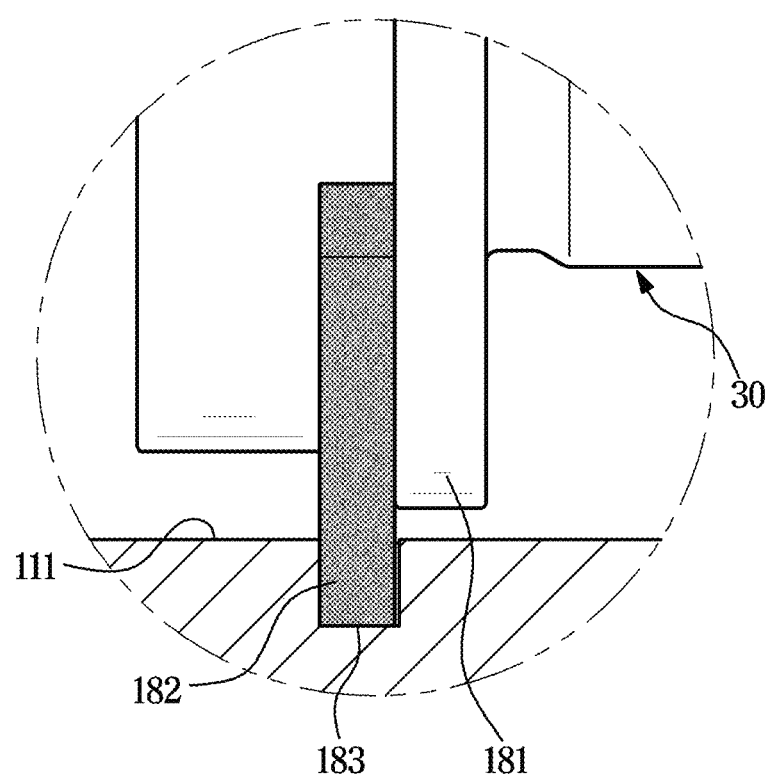
FIG. 22 is an enlarged view illustrating part G of FIG. 21.
Figure 23:
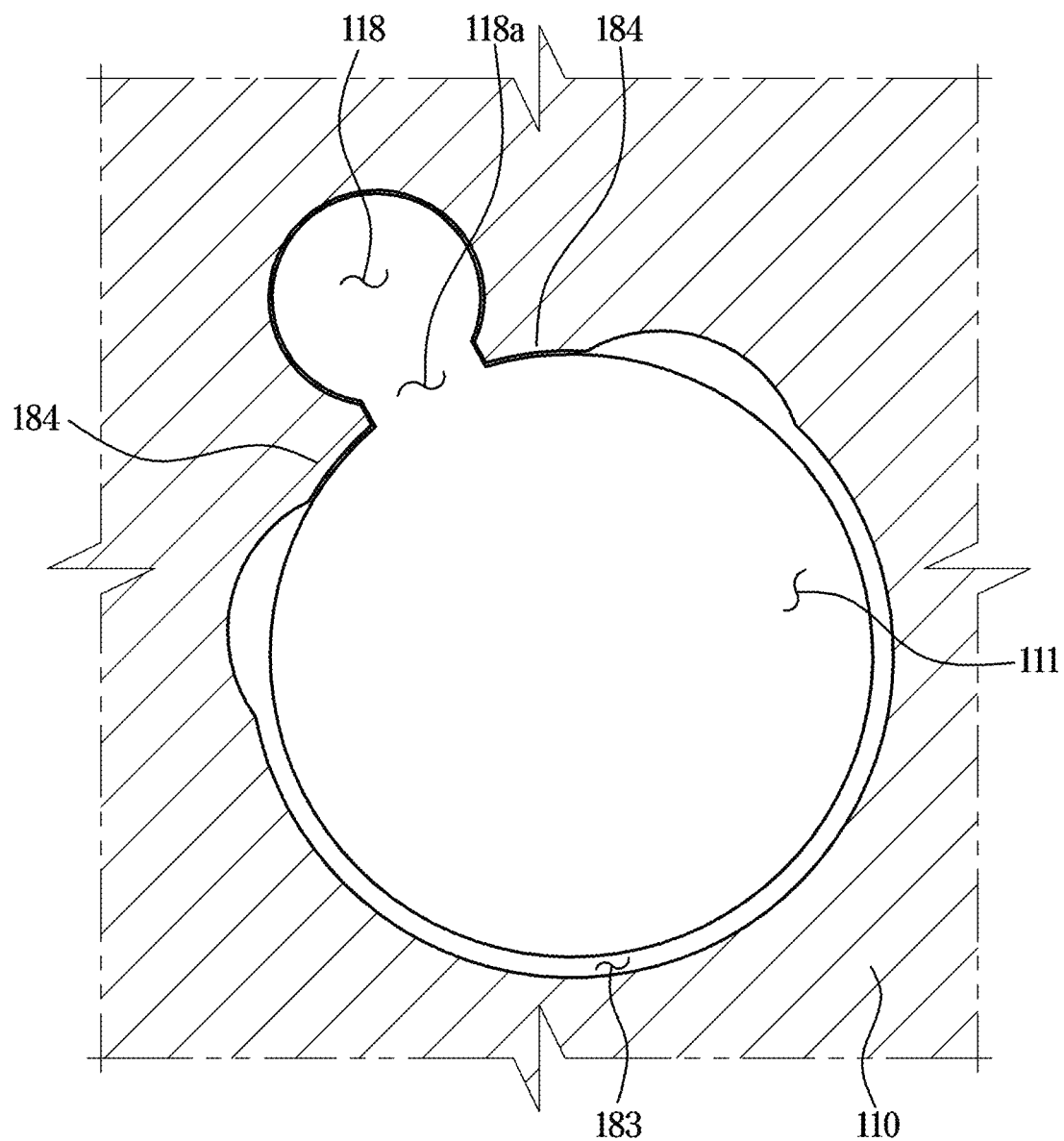
FIG. 23 is a cross-sectional view in another direction illustrating a main bore, a shaft bore, and a communication bore according to the present embodiment.
Figure 24:
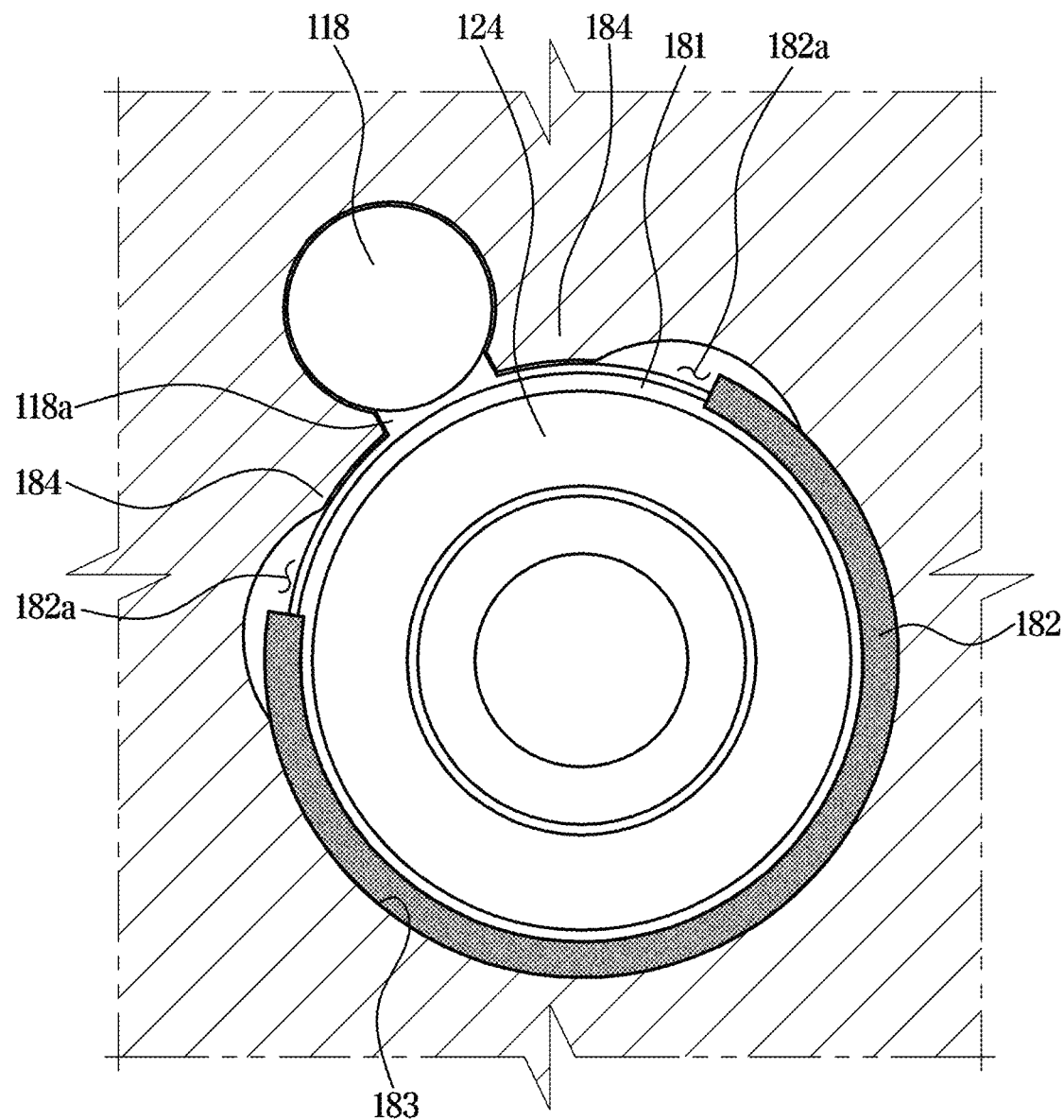
FIG. 24 is a cross-sectional view in another direction illustrating a state in which the catching step is caught and supported by the first stopper according to the present embodiment.

FIG. 20 is a cutaway perspective view of the hydraulic block 110. FIG. 21 is a lateral cross-sectional view of the master cylinder 1 and shows a state in which a catching step 181 is caught and supported by a first stopper 182, and FIG. 22 is an enlarged view of part G of FIG. 21. Further, FIG. 23 is a cross-sectional view in another direction illustrating the main bores 111 and 112, the shaft bore 118, and a communication bore 118a, and FIG. 24 is a cross-sectional view in another direction illustrating the state in which the catching step 181 is caught and supported by the first stopper 182.

Referring to FIGS. 20 to 24, the hydraulic block 110 includes the shaft bore 118 in which the shaft 20 of the displacement detection device (not illustrated) that detects displacement of the pedal moves in the axial direction and the communication bore 118a allowing the main bores 111 and 112 to communicate with the shaft bore 118. As a magnet is supported by the shaft 20 or the shaft 20 is provided as the magnet, a sensor provided in the displacement detection device detects a change in a magnetic force or a magnetic flux density of the magnet, and thus the displacement of the first piston 121 can be detected, and the displacement of the brake pedal can be detected on the basis of the displacement of the first piston 121. Further, the shaft 20 and the first piston 121 may be connected and coupled by a binding member 30, and the binding member 30 may move along the communication bore 118a. In this way, as the main bores 111 and 112 through which the first and second pistons 121 and 124 move and the shaft bore 118 through which the shaft 20 moves communicate with each other inside the hydraulic block 110, a separate sealing member for sealing each bore is not required, and thus the number of components can be reduced, and a structure can be simplified. Further, since the main bores 111 and 112 and the shaft bore 118 may be arranged adjacent to each other, the hydraulic block 110 may be miniaturized and reduced in size.

The catching step 181 extending or protruding in the radial direction may be provided in the outer circumferential surface of the second piston 124, and the first stopper 182 by which the catching step 181 is caught and supported may be provided in the inner circumferential surfaces of the main bore 111 and 112. As an outer diameter of the catching step 181 is provided to be greater than an inner diameter of the first stopper 182, the catching step 181 may be caught by the first stopper 182. In detail, as the other end (a left end in FIGS. 21 and 18) of the catching step 181 is in contact with one end (a right end in FIGS. 21 and 18) of the first stopper 182, a working stroke can be uniformly maintained by limiting a movement distance of the second piston 124 in a return direction. Therefore, in a state in which the stepping force is released from the brake pedal, the second piston 124 may be disposed at a certain position.

The first stopper 182 may be mounted in the inner circumferential surfaces of the main bore 111 and 112 and extend or protrude to the inside of the main bores 111 and 112 such that the catching step 181 is caught and supported thereby. The first stopper 182 may be in a ring shape and provided with an opening 182a and having one open side, and the communication bore 118a may be positioned inside the opening 182a. Therefore, even though the piston and the binding member 30 move, interference with the first stopper 182 can be prevented. The first stopper 182 may be made of a plastic material and can suppress noise and vibration occurring when contact and collision with the catching step 181. Further, a diameter of an inner circumferential surface of the first stopper 182 is provided to correspond to a diameter of an outer circumferential surface of a portion of the second piston 124 facing the same, and thus a sagging phenomenon due to a load of the second piston 124 can be prevented.

A first stopper groove recessed in the circumferential direction may be provided in an inner circumferential surface of the main bores 111 and 112, particularly, the first bore 111, so that the first stopper 182 may be stably supported and mounted on the main bores 111 and 112. The first stopper 182 is inserted into and seated on the first stopper groove and can thus be stably supported at a predetermined position and prevented from being separated. The first stopper groove may include a separation prevention part 184 protruding to the inside of the opening 182a and facing both ends of the opening 182a of the first stopper 182, rotation of the first stopper 182 is prevented by the separation prevention part 184, and thus the first stopper 182 can be prevented from entering the communication bore 118a. Further, an inner circumferential surface of the separation prevention part 184 may be formed to be continuous with the inner circumferential surface of the main bores 111 and 112 or the first bore 111 so that the piston does not interfere with the separation prevention part 184. In FIGS. 22 and 23, it is illustrated that both ends of the separation prevention part 184 are formed to be curved by a grinding to order process to easily manufacture the separation prevention part 184 on the hydraulic block 110. However, this is an example for helping understanding of the present disclosure, the present disclosure is not limited to the corresponding shape, and the shape of both ends of the separation prevention part 184 may be variously formed depending on a manufacturing method.

Figure 25:
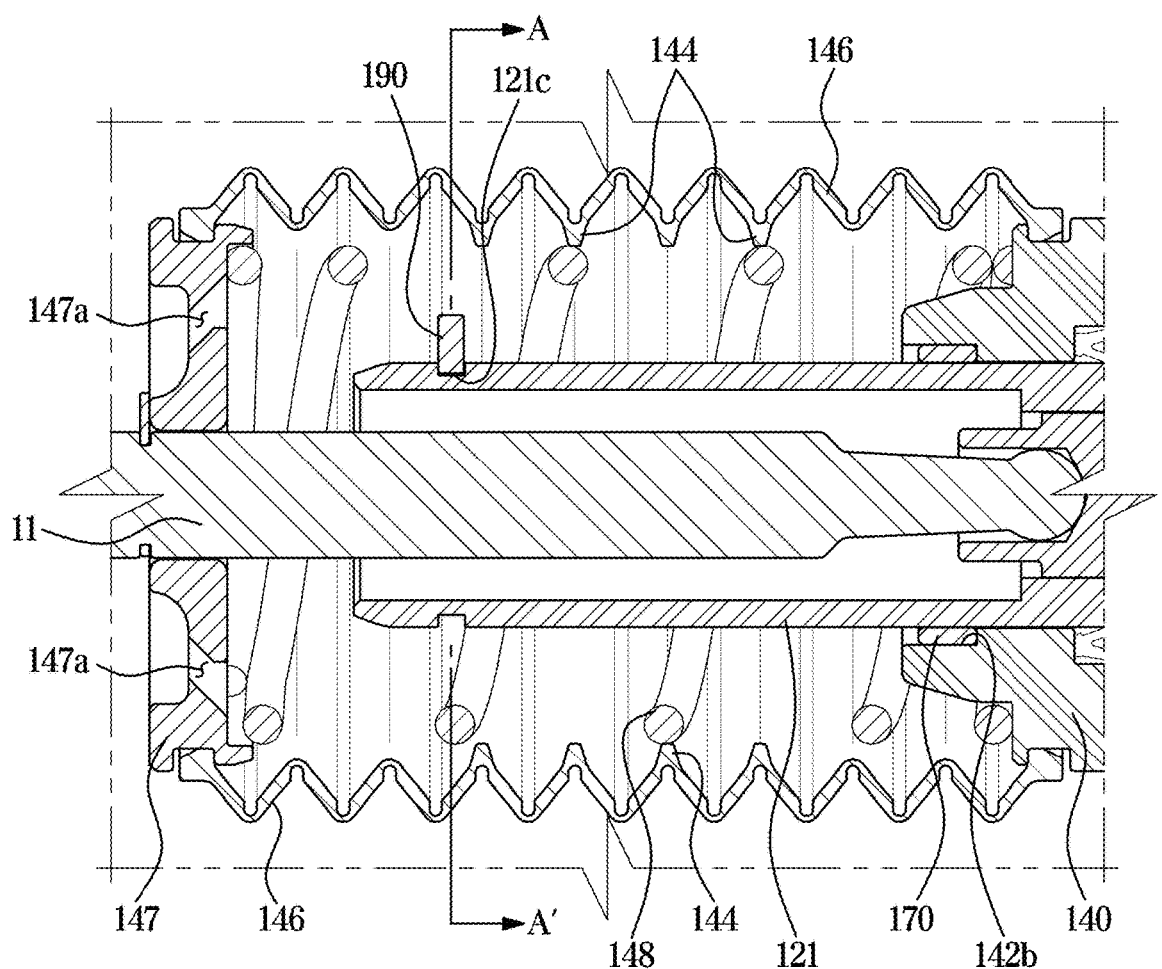
FIG. 25 is an enlarged view illustrating part D of FIG. 2.

FIG. 25 is an enlarged view illustrating part D of FIG. 2.

Referring to FIG. 25, the support plate 147 may be fixedly installed in the input rod 11. the boot 146 that is contracted and extended according to the displacement of the input rod 11 may be supported by the support plate 147, and the other end of the piston spring 148 elastically supporting the input rod 11 and the first piston 121.

The support plate 147 may be provided in a plate shape, fixed to the outer circumferential surface of the input rod 11, and firmly support the boot 146 and the piston spring 148, and the boot 146 may be made of an elastically deformable material such as rubber.

Meanwhile, the input rod 11 and the first piston 121 reciprocate by the operation of the brake pedal, the boot 146 is contracted and extended by the reciprocating movement of the input rod 11, and it is required that the inside and the outside of the boot 146 communicate with each other for smooth deformation of the boot 146. In this case, when foreign substances such as dust or moisture are introduced into the boot 146, performance of components such as the input rod 11 and the piston spring 148 may be adversely affected, furthermore, the possibility that the foreign substances are introduced into the mounting block 140 or the hydraulic block 110 increases, and thus performance and durability of a product may be degraded.

Accordingly, the support plate 147 may include at least one vent hole 147a penetrated such that the inside and the outside of the boot 146 communicate with each other, and the vent hole 147a may be inclined at a certain angle in the axial direction. As the inside and the outside of the boot 146 communicate with each other by the vent hole 147a, smooth deformation of the boot 146 is promoted, and at the same time, as the vent hole 147a is inclined at a certain angle, foreign substances such as dust are prevented from directly penetrating into the boot 146, and thus inflow of foreign substances can be suppressed.

Meanwhile, after the input rod 11 and the first piston 121 move forward by the operation of the brake pedal, when the stepping force of the brake pedal is released or braking is released, the input rod 11 and the first piston 121 return to original positions by the piston spring 148. In this case, while the piston spring 148 is compressed and then expanded again, shaking occurs due to an elastic restoring force of the piston spring 148 itself, and thus noise and vibration occur.

Accordingly, the master cylinder 1 according to the present embodiment is provided with a noise suppression protrusion 144 to reduce noise and vibration occurring in the operation of the piston spring 148.

Figure 26:
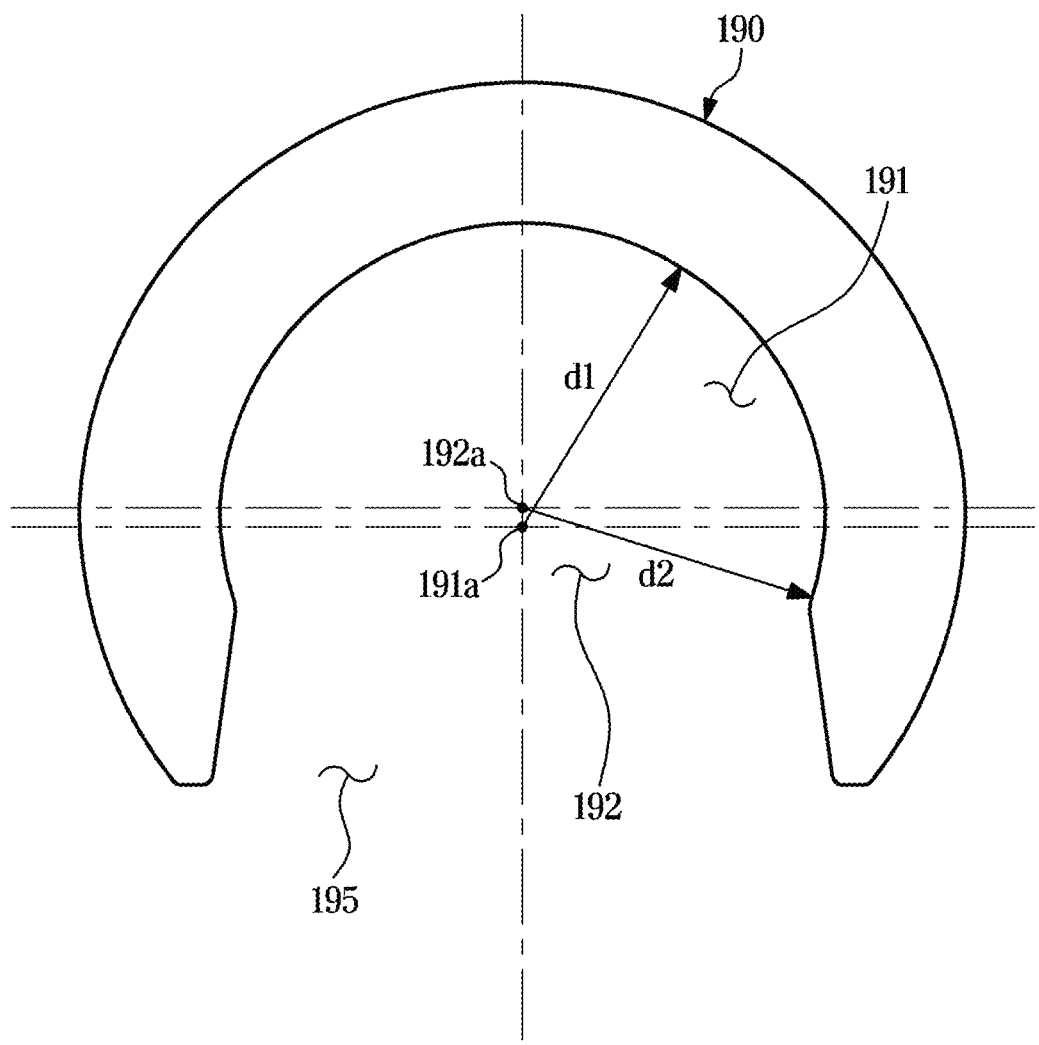
FIG. 26 is a side view in another direction illustrating a second stopper according to the present embodiment.
Figure 27:
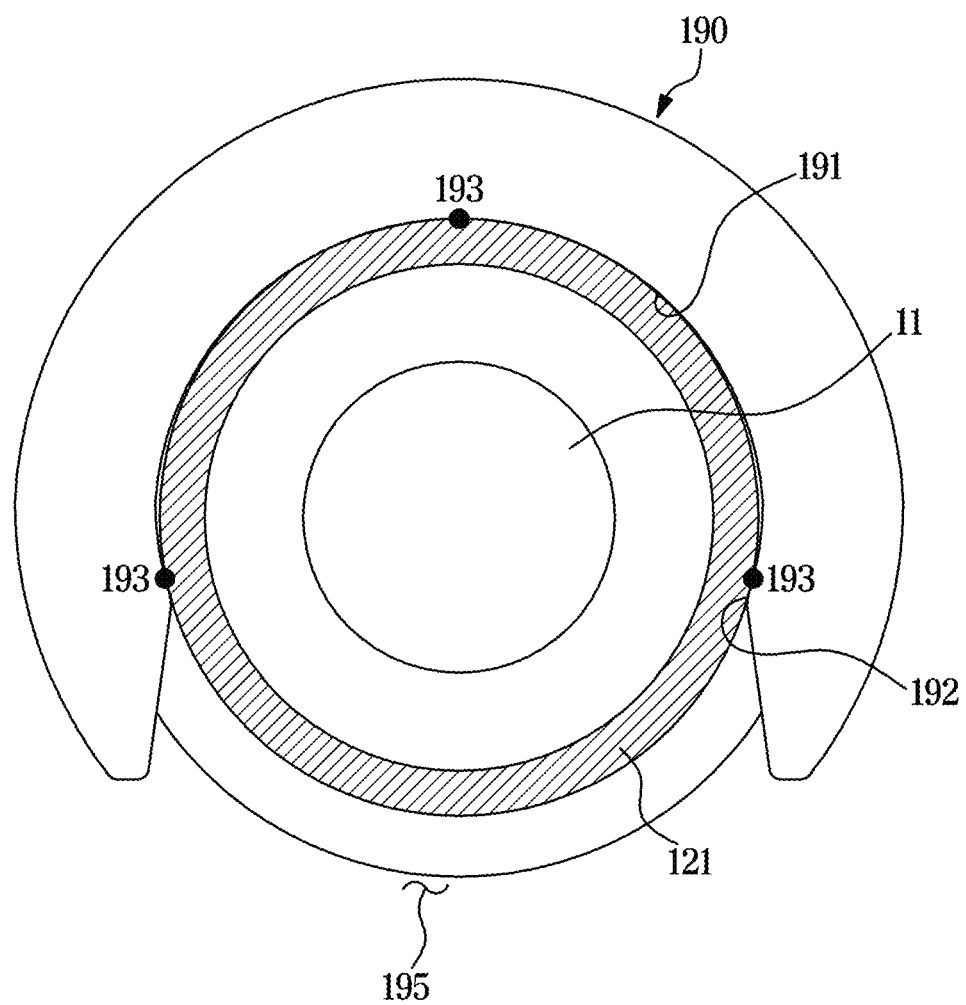
FIG. 27 is a cross-sectional view along line A-A' of FIG. 25 and is a side view in another direction illustrating a state in which the second stopper is mounted on the first piston.

FIG. 26 is a side view in another direction illustrating a second stopper 190, and FIG. 27 is a cross-sectional view along line A-A' of FIG. 25 and is a side view in another direction illustrating a state in which the second stopper 190 is mounted on the first piston 121.

Referring to FIGS. 25 to 27, the noise suppression protrusion 144 may be provided on the inner circumferential surface of the boot 146. The noise suppression protrusion 144 protrudes inward from the inner circumferential surface of the boot 146 and is provided to maintain contact with at least a portion of an outer circumferential surface of the piston spring 148. The noise suppression protrusion 144 may be provided integrally with the boot 146, and accordingly, like the boot 146, the noise suppression protrusion 144 may be made of an elastically deformable material such as rubber. The noise suppression protrusion 144 protrudes or extends inward from the inner circumferential surface of the boot 146 and is in contact with at least a portion of the outer circumferential surface of the piston spring 148, and thus the noise suppression protrusion 144 can absorb resonance generated by the piston spring 148, thereby alleviating noise and vibration. At least one point of the outer circumferential surface of the piston spring 148 and the noise suppression protrusion 144 may be provided to always maintain a contact state regardless of whether the piston spring 148 is compressed or expanded.

The second stopper 190 may be provided on an outer circumferential surface of the other side (a left side in FIG. 25) of the first piston 121 exposed to the outside of the mounting block 140. The second stopper 190 may be mounted to extend or protrude radially from the outer circumferential surface of the first piston 121. The second stopper 190 may be provided in a ring shape and provided with therein an accommodation portion through which the first piston 121 passes and a mounting opening 195 having one open side. Therefore, when the first piston 121 moves forward according to the operation of the brake pedal, the second stopper 190 is caught by the other end (a left end in FIG. 25) of the mounting block 140, and thus the working stroke can be uniformly maintained by limiting a forward movement distance of the first piston 121. The second stopper 190 may be inserted into and seated on a second stopper groove 121c recessed in the outer circumferential surface of the first piston 121 in the circumferential direction so that the second stopper 190 can be stably supported on the outer circumferential surface of the first piston 121.

Meanwhile, when the second stopper 190 is in contact with the other end of the mounting block 140, noise and vibration may occur. To reduce the noise and vibration occurring in this case, the accommodation portion of the second stopper 190 may be divided into two sections having different diameters. In detail, the accommodation portion may be divided into a first accommodation portion 191 having a first radius d1 with respect to a first circle center point 191a and a second accommodation portion 192 having a second radius d2 with respect to a second circle center point 192a. The second circle center point 192a may be eccentric closer to the mounting opening 195 than the first circle center point 191a, and the second radius d2 may be provided to be smaller than the first diameter d1. Therefore, when the second stopper 190 is mounted on the outer circumferential surface of the first piston 121, the inner circumferential surface of the second stopper 190 and the outer circumferential surface of the first piston 121 are coupled to each other by three contact points 193. As the second stopper 190 and the first piston 121 are coupled to each other by means of the three contact points 193, a fastening force between the two components is promoted, and a contact area is minimized. Further, even when the second stopper 190 is in contact with the mounting block 140 on the outer circumferential surface of the first piston 121 and thus shaking occurs, generation of noise and vibration can be suppressed.

In a master cylinder according to the present embodiment, operation reliability and performance can be improved.

In the master cylinder according to the present embodiment, noise and vibration generated when a piston is displaced can be reduced.

In the master cylinder according to the present embodiment, a working stroke of the piston can be maintained as constant.

In the master cylinder according to the present embodiment, leakage of a pressing medium and inflow of foreign substances can be prevented.

In the master cylinder according to the present embodiment, durability of a product can be improved by alleviating an impact applied to components.

In the master cylinder according to the present embodiment, assembly and miniaturization of the product can be promoted.

What is claimed is:

1. A master cylinder comprising:
a hydraulic block provided with a main bore formed therein in an axial direction;
a first piston having one side inserted into the main bore to be displaceable and the other side exposed to an outside of the hydraulic block and mechanically connected to a brake pedal through an input rod having one end physically connected to the first piston and the other end connected to the brake pedal;
a second piston inserted into the main bore more inside than the first piston to be displaceable;
an elastic member provided between the first piston and the second piston; and
a mounting block provided with a sub bore formed therein in the axial direction and the sub bore where the first piston is inserted thereinto and passes therethrough to be displaceable and having one side coupled to an other side of the hydraulic block,
wherein the hydraulic block includes at least one hydraulic flow path formed through the other side of the hydraulic block, and
the mounting block includes a connection flow path allowing the sub bore to communicate with the hydraulic flow path.

2. The master cylinder of claim 1, wherein the hydraulic flow path is spaced a certain distance from the main bore on the hydraulic block, and
the connection flow path has one end exposed to the one side of the mounting block and the other end connected to the sub bore and is penetrated to be inclined at a certain angle in the axial direction.

3. The master cylinder of claim 2, further comprising:
a support plate fixed to the input rod; and
a boot having one end supported by the mounting block and the other end supported by the support plate and provided to be stretchable,
wherein the support plate includes a vent hole penetrated such that the inside and the outside of the boot communicate with each other, and
the vent hole is inclined at a certain angle in the axial direction.

4. The master cylinder of claim 2, further comprising:
a first sealing member interposed between the one side of the mounting block and the other side of the hydraulic block to seal the hydraulic flow path and the connection flow path,
wherein the first sealing member extends along an opening of the connection flow path on the one side of the mounting block or an opening of the hydraulic flow path on the other side of the hydraulic block.

5. The master cylinder of claim 4, wherein the first sealing member is provided in a ring shape.

6. The master cylinder of claim 5, wherein the first sealing member is inserted into and seated on a first accommodation groove recessed in the other side of the hydraulic block.

7. The master cylinder of claim 6, wherein the first sealing member includes a first body portion in a center thereof, a first wing portion protruding to an inner side adjacent to the hydraulic flow path on the first body portion, and a second wing portion protruding to an outer side spaced from the hydraulic flow path on the first body portion.

8. The master cylinder of claim 7, wherein an outer circumferential surface of the second wing portion is provided to correspond to a shape of an inner surface of the first accommodation groove.

9. The master cylinder of claim 8, wherein a cross sectional shape of the first body portion is a circular shape, and a thickness of the second wing portion is provided to be smaller than a diameter of the first body portion.

10. The master cylinder of claim 1, wherein the hydraulic block further includes a shaft bore formed therein in the axial direction,
the master cylinder further comprises a second sealing member interposed between the one side of the mounting block and the other side of the hydraulic block and configured to seal the main bore and the shaft bore, and
the second sealing member extends along an opening of the main bore and an opening of the shaft bore on the other side of the hydraulic block.

11. The master cylinder of claim 10, wherein the second sealing member is inserted into and seated on a second accommodation groove recessed in the other side of the hydraulic block.

12. The master cylinder of claim 11, wherein the second sealing member includes a second body portion provided in a center thereof, a third wing portion protruding to an inner side adjacent to the main bore or the shaft bore on the second body portion, and a fourth wing portion protruding to an outer side spaced apart from the main bore or the shaft bore on the second body portion.

13. The master cylinder of claim 12, wherein an outer circumferential surface of the fourth wing portion is provided to correspond to a shape of an inner surface of the second accommodation groove,
wherein a cross-sectional shape of the second body portion is a circular shape, and
a thickness of the fourth wing portion is provided to be smaller than a diameter of the second body portion.

14. The master cylinder of claim 1, wherein the sub bore further includes a first stepped portion stepped at one end thereof, and
wherein the master cylinder further comprises a damper member of which at least a portion is provided to enter an inside of the first stepped portion and
wherein the damper member includes a plurality of outer grooves recessed in at least one of one side and the other side thereof.

15. The master cylinder of claim 10, wherein the hydraulic block further includes a communication bore allowing the main bore to communicate with the shaft bore,
the second piston includes a catching step protruding from an outer circumferential surface thereof,
the master cylinder further comprises a first stopper provided on an inner circumferential surface of the main bore, caught and supported by the catching step, and having an opening formed on one side thereof, and
the communication bore is positioned inside the opening.

16. The master cylinder of claim 15, wherein the main bore further includes a first stopper groove recessed in the inner circumferential surface in a circumferential direction, and
at least a portion of the first stopper is inserted into and seated on the first stopper groove.

17. The master cylinder of claim 16, wherein the first stopper groove includes a separation prevention part protruding from an inner side of the opening.

18. The master cylinder of claim 1, further comprising:
an input rod having one end connected to the first piston and the other end connected to the brake pedal;
a support plate fixed to the input rod;
a boot having one end supported by the mounting block and the other end supported by the support plate and provided to be stretchable; and
a piston spring having one end supported by the mounting block and the other end supported by the support plate and configured to elastically support the input rod or the first piston,
wherein a noise suppression protrusion protruding inward to maintain contact with at least a portion of an outer circumferential surface of the piston spring is provided on an inner circumferential surface of the boot.

19. The master cylinder of claim 18, further comprising:
a second stopper provided at a portion exposed to an outside of the mounting block on an outer circumferential surface of the first piston,
wherein the second stopper includes an accommodation portion through which the first piston passes there inside and a mounting opening having one open side.

20. The master cylinder of claim 19, wherein the outer circumferential surface of the first piston is provided in a circular shape,
the accommodation portion includes:
a first accommodation portion having a first circle center point and a first radius from the first circle center point; and
a second accommodation portion having a second circle center point and a second radius from the second circle center point,
the second circle center point is provided to be closer to the mounting opening than the first circle center point, and
the second radius is provided to be smaller than the first radius.

* * * * *